United States Patent [19]
Huang et al.

[11] Patent Number: 6,067,292
[45] Date of Patent: May 23, 2000

[54] PILOT INTERFERENCE CANCELLATION FOR A COHERENT WIRELESS CODE DIVISION MULTIPLE ACCESS RECEIVER

[75] Inventors: Howard C. Huang, Red Bank; Chih-Lin I, Monmouth, both of N.J.; Stephan ten Brink, Allmersbach im Tal, Germany; Giovanni Vannucci, Middletown Township, Monmouth County, N.J.

[73] Assignee: Lucent Technologies Inc, Murray Hill, N.J.

[21] Appl. No.: 08/841,316

[22] Filed: Apr. 30, 1997

Related U.S. Application Data

[63] Continuation-in-part of application No. 08/700,266, Aug. 20, 1996, Pat. No. 6,009,089.

[51] Int. Cl.[7] .................................................. H04J 13/00
[52] U.S. Cl. ............................................................ 370/342
[58] Field of Search .................................... 370/342, 209, 370/203, 210, 320, 441, 479, 516, 335, 341, 465, 206, 205, 208, 215, 285, 442, 329, 500, 503, 535; 375/208, 326, 375, 222, 206, 200; 714/752, 753, 754, 758, 751

[56] References Cited

U.S. PATENT DOCUMENTS

| | | | |
|---|---|---|---|
| 5,764,687 | 6/1998 | Easton | 375/260 |
| 5,799,010 | 8/1998 | Lomp et al. | 375/208 |

*Primary Examiner*—Dang Ton

[57] ABSTRACT

A Code-Division Multiple Access (CDMA) receiver removes the pilot signal from the received signal. The pilot signal is defined by its multipath parameters (amplitudes, phase shift and delays) and its signature sequence. Since this information is known at the user's receiver terminal (i.e., handset), the pilot signals of the interfering multipath components of the baseband received signal are detected and removed prior to demodulation of the desired multipath component. The pilot signal may be cancelled prior to or following the data accumulation stage. The pilot signal cancellation can be switched on and off depending on the detected path signal level.

24 Claims, 17 Drawing Sheets

PILOT INTERFERENCE CANCELLATION FOR A COHERENT WIRELESS CODE DIVISION MULTIPLE ACCESS RECEIVER

CROSS-REFERENCE TO RELATED APPLICATIONS

This is a continuation-in-part of application of the same title, Ser. No. 08/700,266, filed on Aug. 20, 1996 and referred to as H. C. Huang 1-16-2-21 now U.S. Pat. No. 6,009,089.

Related subject matter is also disclosed in the previously filed applications entitled "DEMODULATOR PHASE CORRECTION FOR CODE DIVISION MULTIPLE ACCESS RECEIVER" by S. ten Brink, Ser. No. 08/699,008, filed on Aug. 16, 1996; now U.S. Pat. No. 5,910,950, issued on Jun. 8, 1999 "METHOD AND APPARATUS OF A MULTI-CODE CODE DIVISION MULTIPLE ACCESS RECEIVER HAVING SHARED ACCUMULATOR CIRCUITS", by H. C. Huang, C.-L. I, A. Partyka, S. ten Brink, and C. A. Webb III, Ser. No. 08/700,257, filed on Aug. 20, 1996; now U.S. Pat. No. 5,881,056 issued on Mar. 9, 1999 "METHOD AND APPARATUS OF A MULTI-CODE CODE DIVISION MULTIPLE ACCESS RECEIVER USING A SINGLE DATA CORRELATOR", H. C. Huang, C.-L. I, S. ten Brink, and C. A. Webb III, Ser. No. 08/700,262, filed on Aug. 20, 1996; now U.S. Pat. No. 5,870,378, issued on Feb. 9, 1999 and "AN IMPROVED MULTI-CODE CODE DIVISION MULTIPLE ACCESS RECEIVER," by C.-L. I, A. Partyka, and C. A. Webb III, Ser. No. 08/678,834, filed on Jul. 12, 1996, now U.S. Pat. No. 5,737,326, issued on Apr. 7, 1998, all of which are assigned to the same Assignee.

FIELD OF THE INVENTION

This invention relates to Code Division Multiple Access (CDMA) receivers and, more particularly, to a coherent MC-CDMA receiver using pilot interference cancellation.

BACKGROUND OF THE INVENTION

Code-Division Multiple Access (CDMA) has become one of the most prominent schemes for wireless communication systems. CDMA users are distinguished from one another by difference code sequences. Due to the wide band nature of the CDMA signal, the receivers can be made robust against fading by exploiting the built-in time diversity using a rake receiver. In a coherent implementation of a rake receiver, a pilot signal is used to obtain the amplitude and phase estimates of the channel needed for coherent detection. As in the case of the IS-95 CDMA system, the pilot signal is designed to be orthogonal to the users' spreading codes so that in the rare case of no multipath dispersion, the pilot signal will not cause interference at the matched filter output for the desired user. However, if there is multipath dispersion, there will be unwanted interference at the matched filter output due to a variety of multipath components which are not orthogonal to the desired signal. Specifically, for a given multipath component of a desired traffic channel, its matched filter output will have unwanted contributions due to its other multipath components and the other multipath components of the other channels and the pilot signal. Since the pilot signal represents about 20 percent of the power of the downlink signal, its multipath components can be especially damaging to a desired user's bit decision via the near-far effect if the total number of active traffic channels is high. Undesirably, conventional rake receivers do not account for the interchannel multipath interference, and as a result, its performance suffers.

SUMMARY OF THE INVENTION

In accordance with the present invention, a CDMA receiver is disclosed which removes the pilot signal from the received signal. The pilot signal is defined by its multipath parameters (amplitudes, phase shift and delays) and its signature sequence. Since this information is known at the user's receiver terminal (i.e., handset), the pilot signals of the interfering multipath components of the baseband received signal are detected and removed prior to demodulation of the desired multipath component.

More particularly, our CDMA receiver receives and demodulates a coherent CDMA signal including at least one user data channel and a separate pilot channel received over a plurality of L(L>or =2) paths, where the desired data channel is orthogonal to the pilot channel for a given path. The CDMA receiver comprises L path demodulators, each demodulator for estimating a data channel and a pilot channel from a CDMA signal received over one of the L paths and for generating L−1 cancellation signals each to be used by a specific one of L subtractor means. Each of the L subtractor means is used for subtracting the L−1 cancellation signals, produced by different ones of the other L−1 path demodulators, from the CDMA signal associated with that subtractor means.

In a pre-demodulation embodiment, the L−1 cancellation signals are reconstructed pilot signals, and each of the subtractor means is located prior to its associated demodulator to subtract the reconstructed pilot signals from the signal inputted to its demodulator.

In a post-accumulation embodiment, each of the L−1 cancellation signals is a pair of correlator-processed reconstructed pilot signals, and each of the subtractor means is a pair of subtractors, located after a pilot and a data accumulator of its demodulator, for subtracting the pair of correlator-processed reconstructed pilot signals from the signal outputted from its data and pilot accumulators.

According to another embodiment of the present invention, the pilot signal cancellation can be switched on and off in response to a detected path signal level which exceeds a predetermined level.

DETAILED DESCRIPTION

Figure 1:
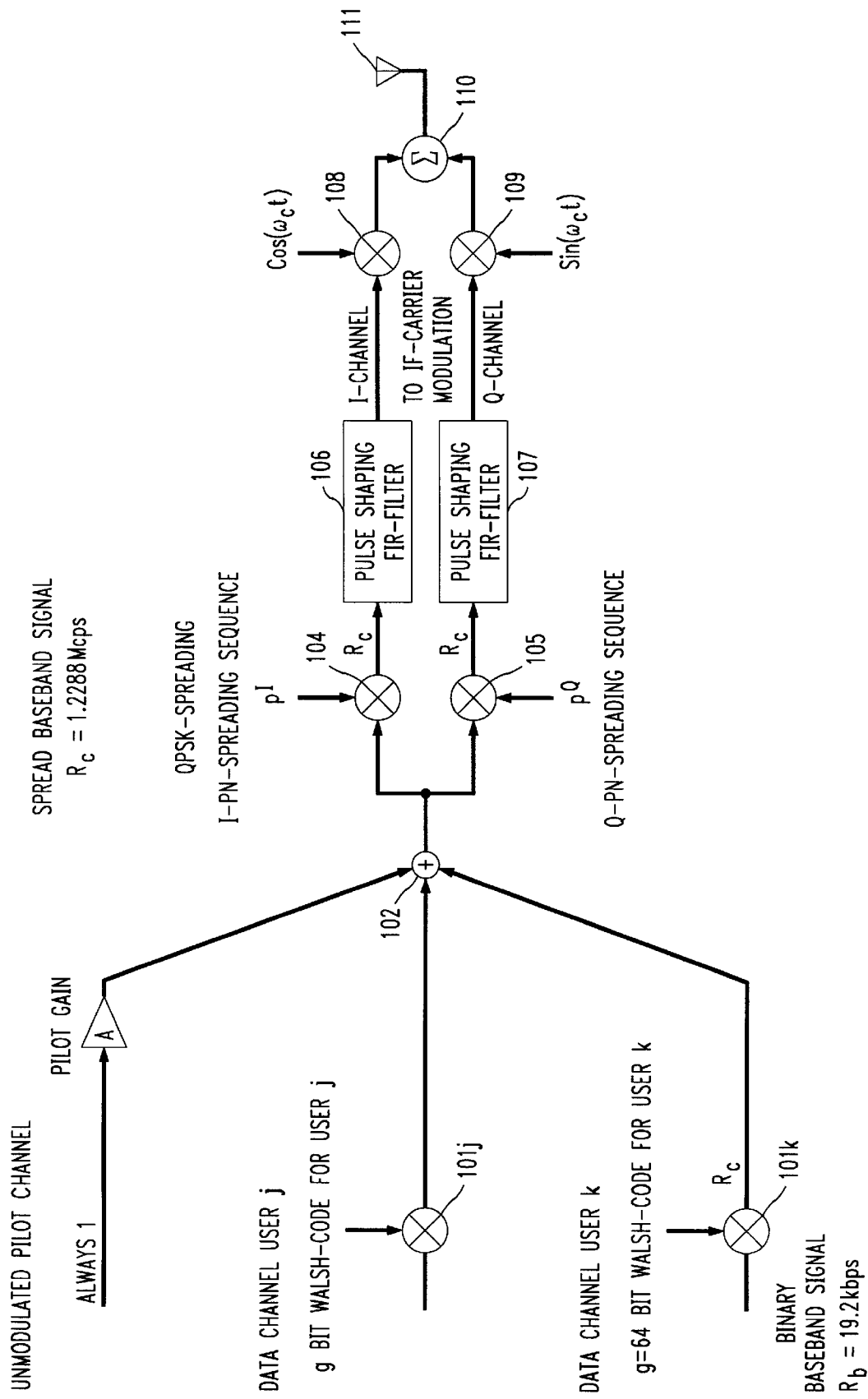
FIG. 1 shows a typical transmitter of a CDMA communication link useful in explaining the operations of the present invention.

Shown in FIG. 1 is a transmitter for a synchronous pilot code aided CDMA communication link, including the values given for IS-95. As shown in an example, data signals from Users j and k at rate $R_b$ (bit-rate, symbol-rate) are coupled to code spreaders, e.g., 101*j* and 101*k*, where different orthogonal Walsh codes of length g (g=64) are used as user-individual spreading sequences. The output of code coupled to code spreaders, e.g., 101*j* and 101*k* are combined together with a pilot signal in adder 102 to form a Walsh-spread baseband signal. There are at most g−1 data channels (including control channels) which can be utilized at once (one channel is occupied by the pilot signal).

The Walsh-spread baseband signal, illustratively, at rate $R_c$ is multiplied in coders 104–105 by another PN-code spreading sequence, also called short code or pilot code sequence.

This spreading (Walsh- and short-code spreading) widens the bandwidth of the data signal over a broad frequency spectrum. The resulting chip-rate signal occupies a $$g = \frac{R_c}{R_b}$$

times larger bandwidth than the original symbol-rate signal. The spreading sequence, illustratively, may be a periodic binary PN-sequence (PN: Pseudo Noise), different for the I- and Q-channel (QPSK-spreading). The spreading sequence is also called "chip-sequence" and thus the processing rate after the spreading is called "chip-rate" $R_c$.

Note an unmodulated pilot code (Walsh-code 0, always +1, and its data always +1) is embedded in the data signal as a phase reference for coherent demodulation of the data channels at the receiver. One pilot channel for all users is sufficient since it is a synchronous CDMA link.

The outputs from coders 104–105 are each filtered by FIR filters, 106 and 107, respectively. The outputs of the FIR filters 106 and 107 are then up-converted by modulators 108 and 109 using radio carrier frequency signals $\cos(\omega_c t)$ and $\sin(\omega_c t)$, respectively. The output of modulators 108 and 109 are radio frequency signals which are combined in combiner 110 and transmitted via antenna 111 over the air to the mobile user stations.

This radio frequency QPSK/CDMA signal includes all channels summed together (data-channels, pilot channel). One bit in the baseband (also referred to as symbol) at rate $R_b$ consists of g 'chips' at rate $R_c$ on the channel.

Illustratively, for an IS-95 type transmitter the parameters are: $R_b$=19.2 kbps (kilobit per second), $R_c$=1.2288 Mcps (megachip per second), thus g=64.

Figure 2:
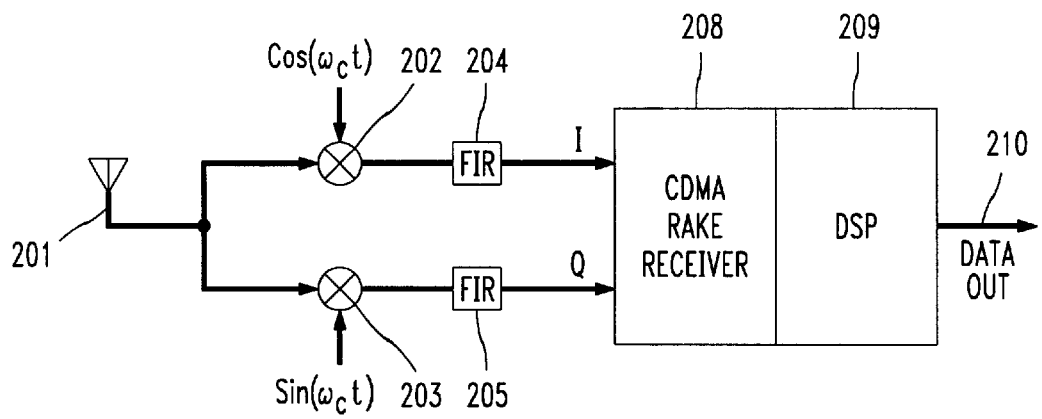
FIG. 2 shows a simplified block diagram of an illustrative CDMA receiver that can be used at a mobile station.

FIG. 2 shows a simplified block diagram of an illustrative CDMA receiver that can be used at a mobile station. The radio frequency signals received via antenna 201 are down-converted by modulators 202 and 203, using radio frequency signals $\cos(\omega_c t)$ and $\sin(\omega_c t)$, respectively. The output of down converters 202 and 203 are each filtered by an anti-aliasing LPF (Low Pass Filter) 204 and 205, respectively to produce a resulting baseband I and Q signals. The I and Q signals, are then further decoded and despreaded by a CDMA RAKE receiver 208 operating under control of Digital Signal Processor (DSP) 209 to produce the output data signal 210. The DSP forms a weighted average of each of the data signals received by a different finger, where each finger tracks a different multipath component.

Before we discuss the embodiment of our CDMA demodulator finger with pilot interference cancellation, we first review the operations of a prior art CDMA RAKE receiver. A RAKE receiver is an optimum mechanism for receiving signals in a multipath environment when there is no interference due to other users. In our CDMA system, there will be interference due to other users; however, since the cross-correlations between the desired and interfering signals are usually very low, the RAKE receiver provides very good (but not optimum) performance.

An illustrative example of a RAKE receiver is described in the following references 1) "A Communication Technique for Multipath Channels" by R. Price and P. E. Green Jr.; Proceedings IRE, Vol. 46, Pages 555–570, March, 1958

2) "Introduction to Spread Spectrum Anti-multipath Technique and Their Applications to Urban Digital Radio" by G. L. Turin; Proceedings IEEE, Vol. 65, No. 3, Pages 328–353 March, 1980

3) "Digital Communications" by J. G. Proakis; McGraw-Hill, 1989

Figure 3:
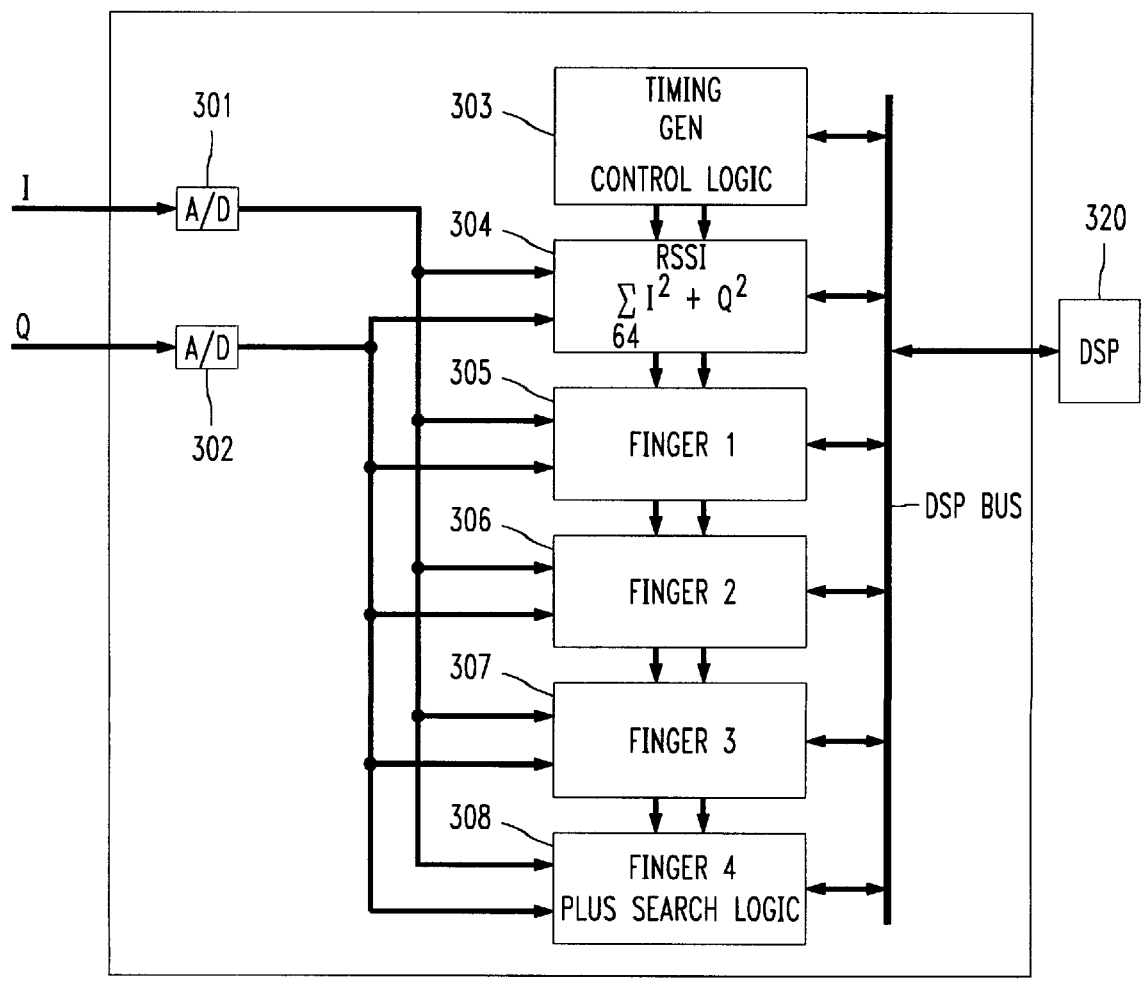
FIG. 3 shows a simplified block diagram of an illustrative CDMA receiver.

FIG. 3 shows an illustrative block diagram of a prior art RAKE receiver typically used in a CDMA system. A RAKE receiver is used in both the forward and reverse links of a CDMA system to take advantage of the inherent time diversity in the received signals arriving via different paths of a multipath environment.

Analog I signals (I) and Q signals (Q) are converted to digital signals by the A/D circuits 301 and 302, respectively. Control logic circuit 303, provides Digital Signal Processor (DSP) interfacing and control, as well as common timing and control functions for the CDMA receiver. Control logic circuit 303 operates under control of signals received over DSP bus from a DSP, not shown. An RSSI (Received Signal Strength Indicator) block 304 calculates the total received signal power of the I and Q signals received over the various signal paths.

In a RAKE receiver, there are several (typically 4) mostly identical "finger" units 305–308. Each of the finger units 305–308 is used to demodulate a received signal arriving over a different air path of the multipath environment. The finger units 305–308 are essentially the same except they have a different time delay, attenuation and phase characteristics. The finger unit 308 additionally includes a small amount of additional logic to allow its use as a high-speed pilot searcher (for use in coherent receivers to detect the Walsh signal pilot shown in FIG. 1).

The pilot searcher finger 308 examines the incoming signal by continuously correlating it with the pilot PN-sequence. It detects different base-stations and multipath-components and delivers the respective PN-offsets to the demodulator fingers 305–307.

Each demodulator finger performs a coherent demodulation of a certain path of the incoming multipath-distorted signal.

Figure 4:
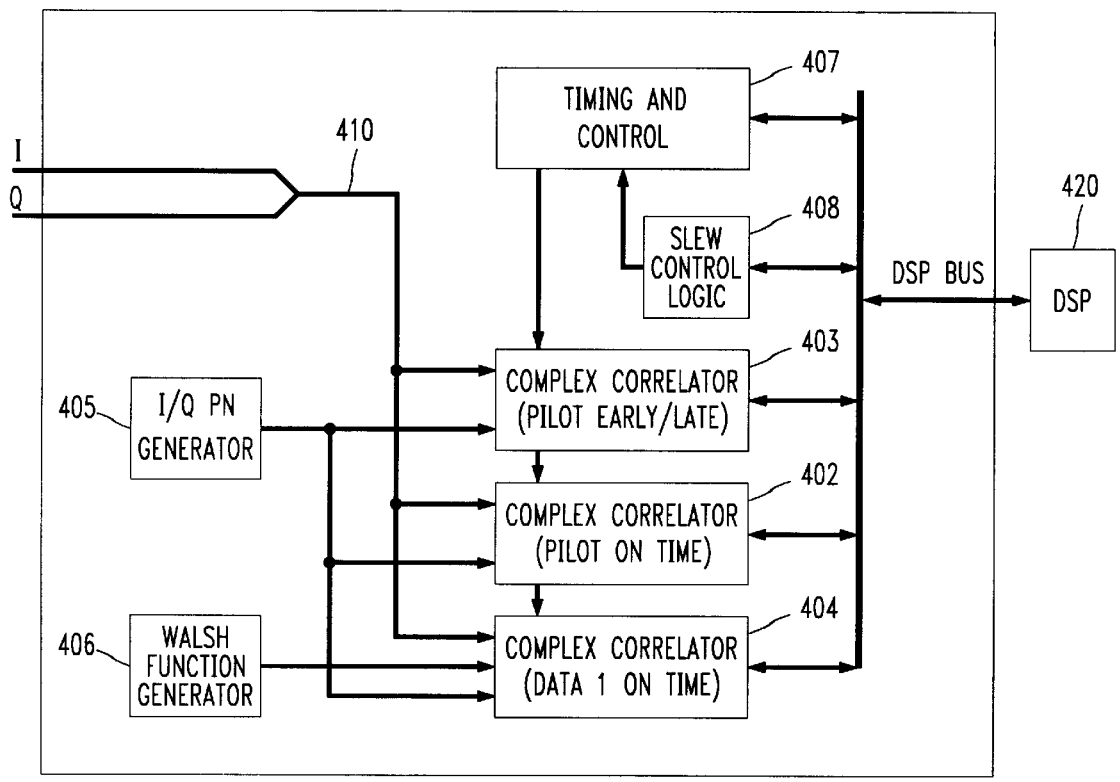
FIG. 4 shows a prior art "RAKE" finger architecture for a coherent CDMA receiver.

FIG. 4 shows a typical embodiment of a RAKE finger for a coherent CDMA receiver for use in a IS-95 forward link. A basic IS-95 RAKE finger in a coherent CDMA receiver has three complex correlators, one for detecting pilot on-time 402, one for detecting pilot early/late 403 and one for data-on-time 404 (which together recover the timing signals). This arrangement allows the decoding and despreading of data on a single Walsh channel by data complex correlator 404. The data output of correlators 402–404 are then outputted over DSP bus to a DSP unit, not shown.

The I/Q PN generator 405 provides input codes to the correlators 402–404. The Walsh function generator 406 provides a Walsh code to the data correlator 404. Control circuit 407 and slew control logic 408 provide control signals for the operation of the RAKE finger and also interface to the DSP bus.

In the following description, conventional variable names are used and are defined below:

| | |
|---|---|
| $T_c$ | Chip-Duration in seconds |
| $R_c = \dfrac{1}{T_c}$ | Chip-rate, IS-95: 1.2288 Mcps |
| $R_b = \dfrac{R_c}{N_c}$ | Bit-rate ( = symbol-rate), IS-95: 19.2 kbps |
| $N_c$ | Number of chips per symbol (bit), IS-95: 64 |
| A | Pilot gain (in comparison to single user amplitude) |
| $\rho$ | Number of samples taken during one chip-interval (oversampling factor) for each I- and Q-channel |
| $\Delta T_l = \left(\Delta_l + \delta_l \cdot \dfrac{1}{\rho}\right) \cdot T_c$ | Delay of l-th multipath component to the main path component, with $\Delta_l$ as the integer part (delay in chips), and $\delta_l$ as the fractional part (delay in $\dfrac{1}{\rho}$ -fractions of a chip); $\Delta$ and $\delta$ are integer values with $\delta = 0 \ldots \rho - 1$ |
| $\tau_l = \rho\Delta_l + \delta_l$ | delay to path 0 in sub-chips; one chip consists of $\rho$ sub-chips ($\tau_0 = 0$ assumed) |
| L | Number of multipath components; indices are $l = 0 \ldots L - 1$ |
| $r_{(l)}^{(n)}$ | received signal vector of n-th symbol for multipath component l (each vector element is a complex number), including noise from other multipath components |
| $p_{(l)}^{(n)}$ | pseudo-random short code of n-th symbol for multipath component l (also called short code, pilot code) |
| $s_{k(l)}^{(n)}$ | symbol signature code (Walsh-code) of n-th symbol for multipath component l (user k), vector elements are real |
| $\hat{c}_{(l)}^{(n)}$ | complex channel estimate obtained from n-th symbol for multipath component l (this is not a vector) |
| $\hat{c}_{(l)}$ | set of available channel estimates for multipath component l |
| $f(\hat{c}_{(l)}; n)$ | function performed on the channel estimates to gain a more reliable channel estimate (e.g. averaging, FIR-LP-filtering); the latest estimate which can be used in the calculation is that of symbol n |
| $y_{(l)}^{(n)}$ | demodulator output of n-th symbol for multipath component l |
| $r^{I,Q}[i] = r[i]$ | the whole composite $\rho$ times oversampled complex signal at the sub-chip rate $\rho R_c$ |
| $\tilde{r}^{(n)}$ | the received signal vector, $\rho R_c$ |

CONVENTIONAL RECEIVER

Figure 5:
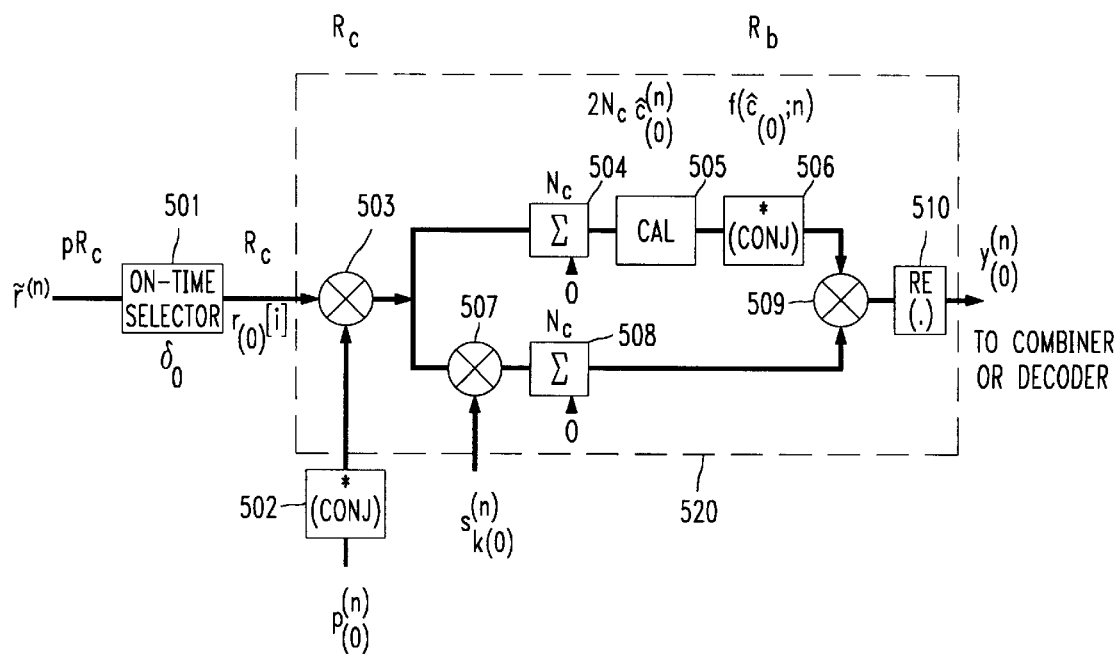
FIG. 5 shows a basic demodulator structure of the Pilot-on-time and Data 1 on-time complex correlators.

With reference to FIG. 5, we describe the basic demodulator structure of the Pilot-on-time and Data 1 on time complex correlators (402 and 404 of FIG. 4, respectively) as a complex signal processing block diagram for a multipath component 0. The elements 501–504 provide the Pilot-on-time correlator 402 function while 501–503, 507, 508 provide the Data 1 on time correlator 404 function. A complex graphical notation is used in FIG. 5 for simpler schematic drawings and analysis. As shown, the input signals is $r[i]=r^I[i]+r^Q[i]$ (i.e., the I and Q inputs of FIG. 4).

The incoming signal r[i], illustratively, is an oversampled complex QPSK DS/CDMA baseband signal (after down conversion) with $\rho$ samples per chip-symbol. The on-time selector 501 picks one out of $\rho$ samples per chip for further processing. By multiplying the signal $r_{(0)}[i]$, in multiplier 503, with the properly aligned short-code PN-sequence $p_{(l)}^{(n)}$, received from complex conjugate circuit 502, pilot despreading is performed. From the resulting signal from multiplier 503, a channel estimate $\hat{c}_{(l)}^{(n)}$ is obtained from the upper accumulator branch (accumulation over one symbol). The upper branch called a 'channel estimation correlator' includes accumulator 504, optionally Channel Estimation Algorithm Block (CAL) 505, and complex conjugate circuit 506. Because the channel coefficients for a particular multipath may not vary much from symbol to symbol, the channel coefficient estimate for the current symbol may be enhanced by CAL 505 which produces a weighted average of all available channel estimates and the current output from 504. Removing the signature code $s^{(n)}_{k(l)}$ (Walsh-code for user k) the lower branch, or 'data correlator' 507–508, recovers the binary information which gets aligned in the signal space (phase/attenuation correction) by multiplying it, in multiplier 509, with the complex conjugate channel estimate (channel weighting) form the upper branch. The block 510 takes the real part of the complex signal from multiplier 509 (the product of the channel estimate output and data correlator output) and outputs it to the decoding part of the receiver (Viterbi decoder, slicer, or multipath combiner), illustratively shown as a Digital Signal Processor (DSP) 605 of FIG. 6.

Regarding CAL block 505, it should be noted that the channel estimates $\hat{c}_{(I)}^{(n)}$ are taken at the symbol-rate. (It is important to mention that the channel estimates include the pilot channel amplitude since they are obtained by correlating with the pilot channel.) It is common to take some sort of weighted sum $f(\hat{c}_{(I)}, n)$—e.g. a low-pass FIR-filtering—of the last $N_\alpha$ channel estimates (with n as the index of the latest available channel estimate which can be included in the channel estimate calculation algorithm) to get a more reliable channel estimate. The gain of the CAL-algorithm is obviously limited by the channel characteristics like fading and VCXO-offset since the channel parameters should remain almost constant during the averaging (or: linear interpolation also possible). If one considers the increasing complexity of CAL it turns out that most of the time a channel estimate over one symbol is sufficient. However, as will be discussed in a later paragraph, out pilot cancellation schemes are not restricted to any channel estimation algorithm.

For the designs discussed in the following sections it is only important to distinguish which channel estimates (the latest one?) can be included in the CAL used for pilot reconstruction and which parts of the demodulation take advantage of the cancellation. The demodulation always has knowledge of the latest channel estimate, whereas the pilot reconstruction does not necessarily.

Regarding the accumulator block, it should be noted that it is assumed to have a storage or hold element at its output. It holds the result of the latest accumulation until updating it with a new result each symbol-clock cycle.

Based on the conventional receiver of FIG. 4, we present several different implementation alternatives of our pilot cancellation scheme, both for pre- and post-demodulation cancellation structures. Our structures utilize the demodulation unit 520, which includes the elements or blocks 503–510.

To keep the drawings simple we, illustratively, focus on a 2-path signal and thus 2 demodulator fingers, finger 0 and finger 1 are sufficient. The extension to multiple paths/fingers is straightforward.

Pre-Demodulation Cancellation Schemes

In pre-demodulation cancellation schemes the pilot interference cancellation (subtraction) is performed on the chip-samples.

Figure 6:
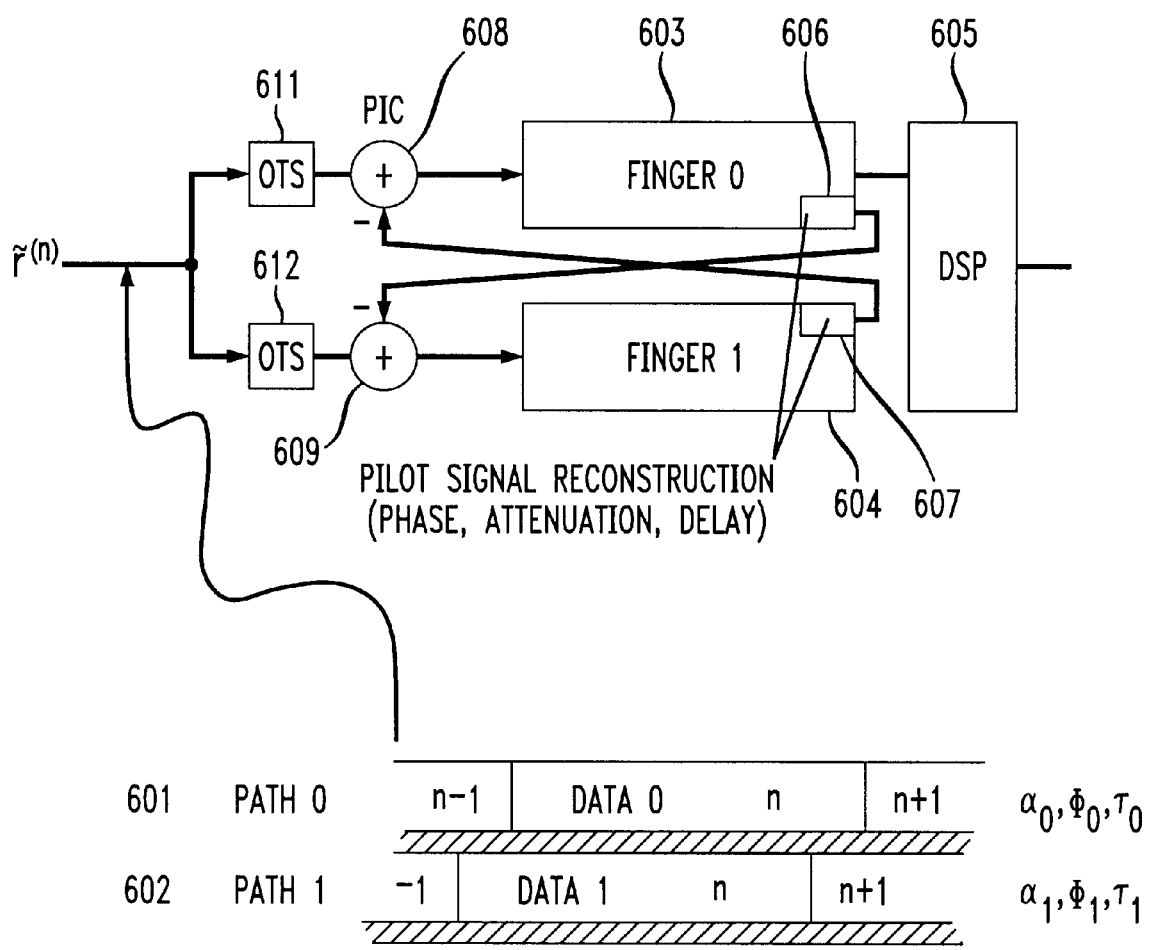
FIG. 6 shows an illustrative block diagram of our inventive pilot cancellation scheme as applied to a two finger coherent CDMA receiver.

Weigh reference to FIG. 6, we present an overview of our Pilot Interference Cancellation (PIC) schemes. Illustratively, out receiver example of FIG. 6 receives signals over only two paths 601 and 602 and hence uses only two of the typical three or more fingers of a receiver (see FIG. 3). The fingers 603 and 604 operate to demodulate the different path signals 601 and 602, respectively, in the manner previously described. The receiver in our example receives a composite signal $r^{(n)}$ and does not know that it includes both the signals from path 0 and path 1. The signal of these paths 0 and 1 differ in attenuation $\alpha$, phase $\phi$ and path delay $\tau$. Since the pilot signals represent about 20 percent of the power of the received path signal, we have recognized that if the pilot signal of path 1 can be eliminated from the received signal of path 0, and vice-versa, the receiver can make a more accurate demodulation.

With this in mind we have modified each finger 603 and 604, to additionally include a pilot reconstruction circuit, shown as 606 and 607, respectively, which recover the respective pilot signals from path 0, 601, and path 1, 602. The received signal $r^{(n)}$ of path 0, $r^{(0)}$ is first processed by on-time selector circuit (OTS) 611 and then by modified finger 603. The received signal $r^{(n)}$ of path 1, $r^{(1)}$ is first processed by on-time selector circuit (OTS) 612 and then by modified finger 604.

The pilot reconstruction circuits, 606 and 607, recover pilot signals with estimated attenuation $\alpha$, phase $\phi$ and path delay $\tau$. As shown, the recovered pilot signal from path 0 is subtracted (or cancelled) in adder circuit 609 from the path 1 signal. In our pre-cancellation schemes, the pilot interference cancellation (subtraction) is performed on the chip-samples prior to demodulation.

Similarly, the recovered pilot signal from path 1 is subtracted in adder circuit 608 from the path 0 signal. The resulting path 0 and path 1 signals minus the pilot signal of path 1 and path 0, respectively, are then more accurately demodulated in finger 0 and finger 1, respectively. In the manner as previously described, the output signals from fingers 0 and 1 are further processed in a bit decision or a Viterbi decoder illustratively implemented in DSP 605.

Figure 7:
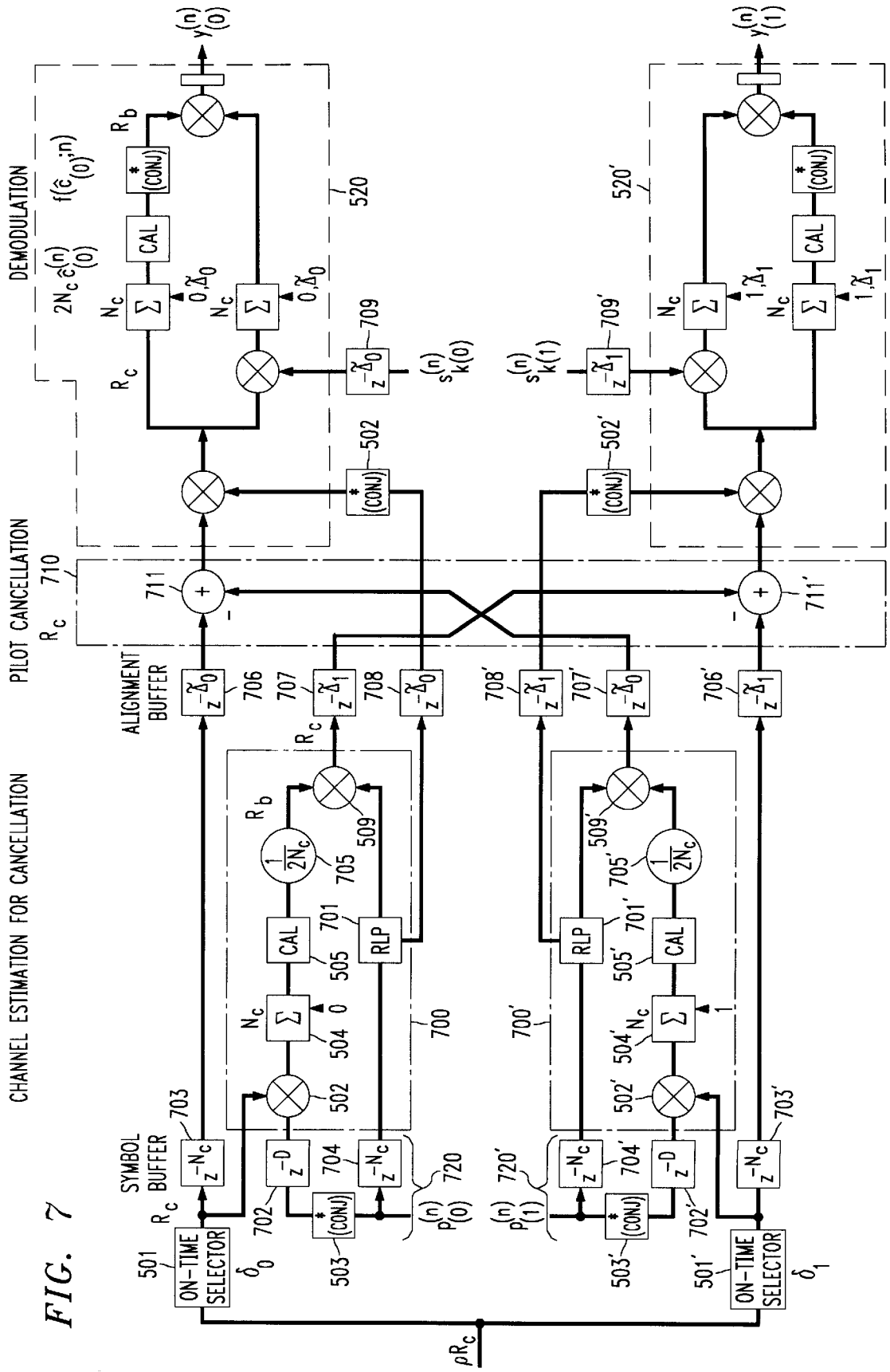
FIG. 7 shows a first embodiment (Detector A) of a pre-demodulation cancellation scheme in accordance with the present invention.

A. Pilot Cancellation with Buffer (Detector A)

with reference to FIG. 7, there is shown a detailed implementation of a two finger pre-cancellation arrangement using a symbol buffer for obtaining latest channel estimates for pilot cancellation. In accordance with the present invention, to use the channel estimate of the current symbol for reconstructing the pilot and cancel it out prior to demodulation the data has to be buffered. The processing is then done in 3 steps:

1. For each finger I, obtain a channel estimate for the I-th multipath component from the received signal and reconstruct the pilot using this estimate.
2. For each of the L buffered received signals, use the reconstructed pilots to cancel the pilot interference caused by the other L−1 multipath signals.
3. Demodulate the resulting signal.

FIG. 7 shows a structure which works according this procedure. In the following description, all of the "primed" numbered blocks operate in the same manner as the non-primed numbered blocks. As shown, the blocks 501'–505', 509', and 520' operate the same as operate as blocks 501–505, 509, and 520 previously described in FIG. 5. The blocks 700 and 700' are separate pilot detectors which use channel estimates (obtained using 504–505 and 504'–505') that have been normalized (by 705 and 705'). The pulse-shaping for the pilot detectors 700 and 700' is taken into account using RLP blocks 701 and 701' (Reconstruction Low-Pass Filter), respectively. The RLPs 701 and 701' are necessary if the delays are not in multiples of the chip-duration. Note, if we did not consider the pulse-shaping the Bit Error Rate (BER) would increase. The implementation of an RLP is described in a later section.

The symbol buffers 703–704 and 703'–704' enable the symbol data to be buffered while the pilot detectors 701 and 701' are reconstructing the pilot signal.

To compensate for the delay introduced by an RLP in one branch, a small RLP-delay buffer $z^{-D}$ is needed (with D as the RLP-delay in chip-samples, $$D = \frac{N}{2},$$

N number of taps of RLP-filter) to be added to the other branch. Thus, delays $z^{-D}$ 702 and 702' compensate for RLP 701 and 701', respectively.

Optionally, for delay offsets in the range of some chips (small in comparison to the total number of chips per symbol), the influence of an alignment-buffer $$z^{-\tilde{\Delta}_l}, \tilde{\Delta}_l = \left(\max_{l=0...L-1} \Delta_l\right) - \Delta_l,$$

shown as delays 706–708 and 706'–708', may be considered. We have determined that such effects are negligible, since in a practical implementation the combination of all finger outputs is performed on the symbol-rate. Therefore, no alignment-buffers 706–708 and 706'–708' are needed anyway. Keeping this in mind the hardware required for an alignment-buffer at the chip-sample level is not justified. Therefore we leave it out in our later disclosed embodiments.

After the pilot signal, of path 0, has been recovered in pilot detector 700, it is applied to the adder 711' to be subtracted from the path 1 signal prior to the demodulation of that signal, by demodulator 520'. The non-pulse-shaped (just delayed, see paragraph on RLP) output from RLP block 701 of pilot detector 700 is delayed and conjugated and used as an input to multiplier 503. Similarly, the pilot signal, of path 1, recovered in pilot detector 701', is applied to the adder 711 to be subtracted from the path 0 signal prior to the demodulation of that signal, by demodulator 520. And, the non-pulse-shaped output from RLP block 701' of pilot detector 700' is delayed and conjugated and used as an input to multiplier 503.

In accordance with another embodiment, the detector A is modified so that the channel estimate (obtained in 700 and 700'), which is used for the pilot reconstruction, is also used for the demodulation process (by demodulators 520 and 520'). In such an arrangement, we do not need two phase estimation accumulations and CAL-blocks per finger. However by doing this, only the data correlator benefits from the pilot cancellation and thus this arrangement will have a weaker BER-performance. The same slight variation is also possible for our later described detector C.

Figure 8:
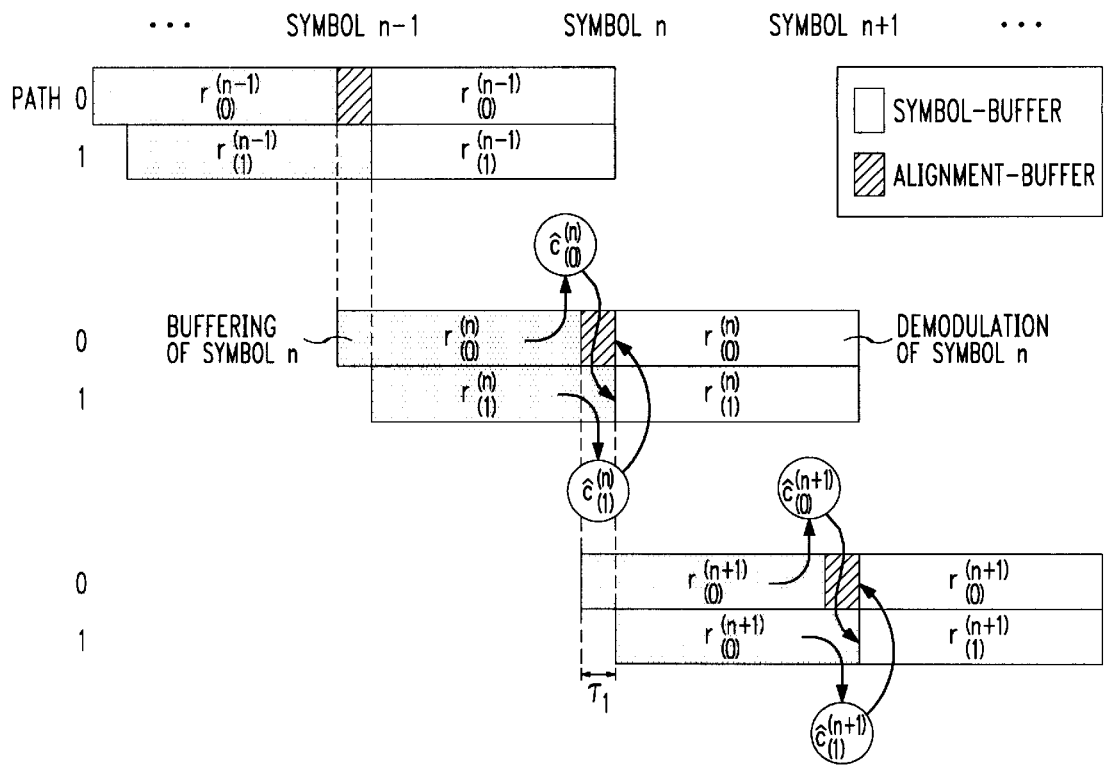
FIGS. 8 and 9 illustrate timing-charts for Detector A of FIG. 7 which show how the channel estimates for pilot reconstruction are obtained with respect to the symbol timing.
Figure 9:
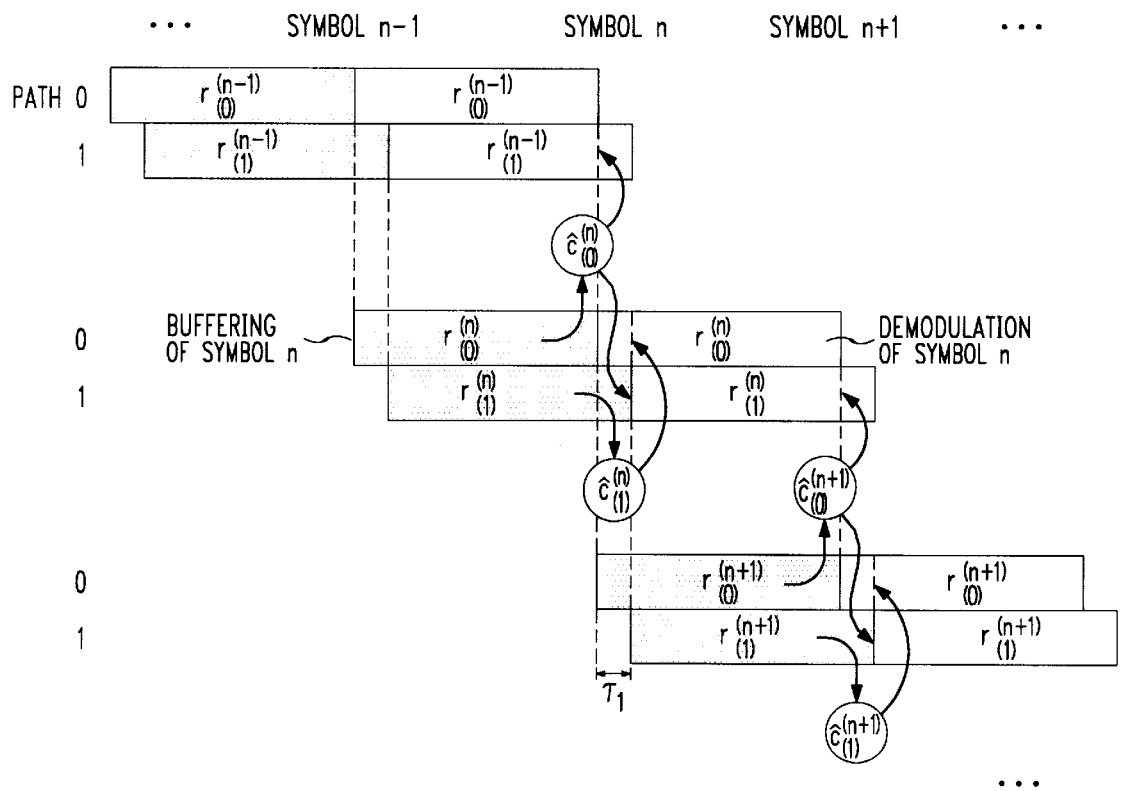

With reference to FIGS. 8 and 9, we describe the timing aspects of the detector A of FIG. 7. The timing-chart of FIG. 8 shows how the channel estimates for pilot reconstruction are obtained with respect to the symbol timing. The symbol-buffers (e.g., 703) guarantees that the pilot cancellation for symbol n can be performed with a channel estimate obtained from data of symbol n (latest channel estimate available). The alignment-buffers (e.g., 706) guarantees that the new channel estimates for pilot cancellation are available at the beginning of the demodulation process.

Shown in FIG. 9 is a timing-chart where the channel estimates for pilot reconstruction do not use alignment-buffers. The performance degradation without alignment-buffer will be negligible if the delay offset $\tau_1$ is in the dimension of some chips ($\tau_0$=0 assumed).

Performance—Detector A

In a Rayleigh-fading environment, the advantage of detector A is that it has the latest channel estimate available for pilot reconstruction which has a positive effect on the BER if the channel characteristics are likely to vary significantly from symbol to symbol.

However, in an AWGN-channel there will be no improvement (to detector B) since the channel characteristics do not change from symbol to symbol.

The channel estimates for reconstructing the pilot signals are obtained from a signal which did not go through a cancellation stage—to this respect a recursive structure like discussed in the next section will have some advantages since there the channel estimates are taken from data which has already gone through a cancellation stage and therefore is affected by less noise.

In practice the chip-samples have a 4 bit resolution (I- and Q-samples). Thus the whole pilot reconstruction processing can work with a low bit resolution (RLP: 4 bit, multiplications at chip-rate: 4 bit). If we did not consider the pulse-shaping we even would not need multiplications at the chip-rate. Another way to get rid of the chip-rate multiplications is explained in the later-described post-demodulation schemes.

B—Recursive Structure without Buffer (Detector B)

Figure 10:
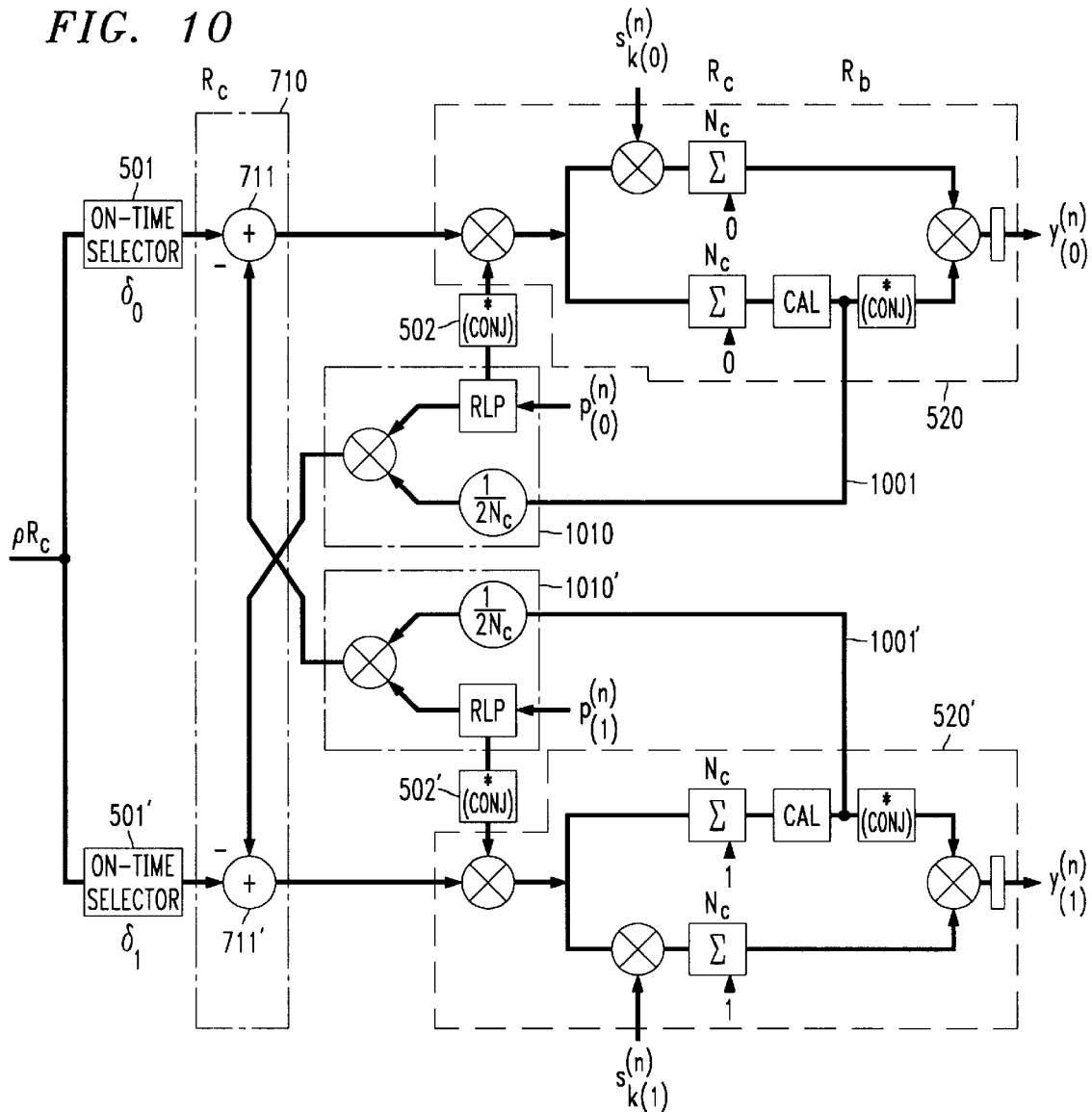
FIG. 10 shows a Detector B which uses recursive pre-cancellation without buffering.

Shown in FIG. 10 is a receiver that uses recursive pre-cancellation without working with previous channel estimates. This structure is the most attractive one for implementation, since there is no buffering required. The additional hardware efforts are minimal. The channel estimates 1001 and 1001' used for demodulation of the previous symbol n−1, from demodulators 520 (finger 0) and 520' (finger 1), are reused, respectively, for reconstructing the pilot signal and cancellation of the next symbol n of fingers 0 and 1, respectively. The pilot reconstruction is done in circuits 1010 and 1010'. The cancellation is performed in the subtractors 711, 711'. The remaining blocks of Detector B operate in the same manner as the identically numbered blocks of previous Figures.

Figure 11:
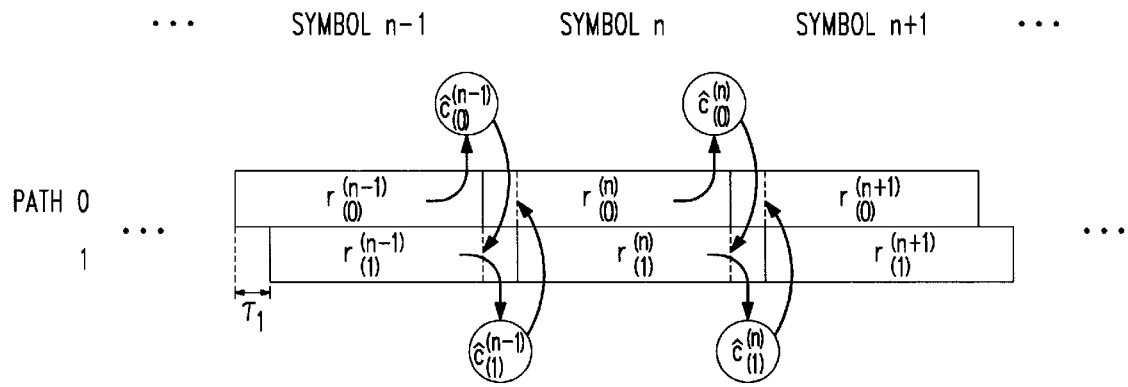
FIG. 11 shows the timing diagram for the Detector B of FIG. 10.

Shown in FIG. 11 is a timing-chart for Detector B showing the channel estimates timing for pilot reconstruction. It can be seen that the pilot cancellation for symbol n operates with a channel estimate obtained from data of symbol n−1 (small parts work with estimates of symbol n, n−2).

Performance —Detector B

The disadvantage of this structure is that the latest channel estimate is not available for cancellation; this can result in performance degradation in a fast fading environment.

However, the recursive loop—here a must—provides a nice side-effect: Now even the channel estimates used for reconstructing the pilot signals are obtained from data which went through a pilot cancellation stage previously.

C—Recursive Structure with Buffer (Detector C)

Figure 12:
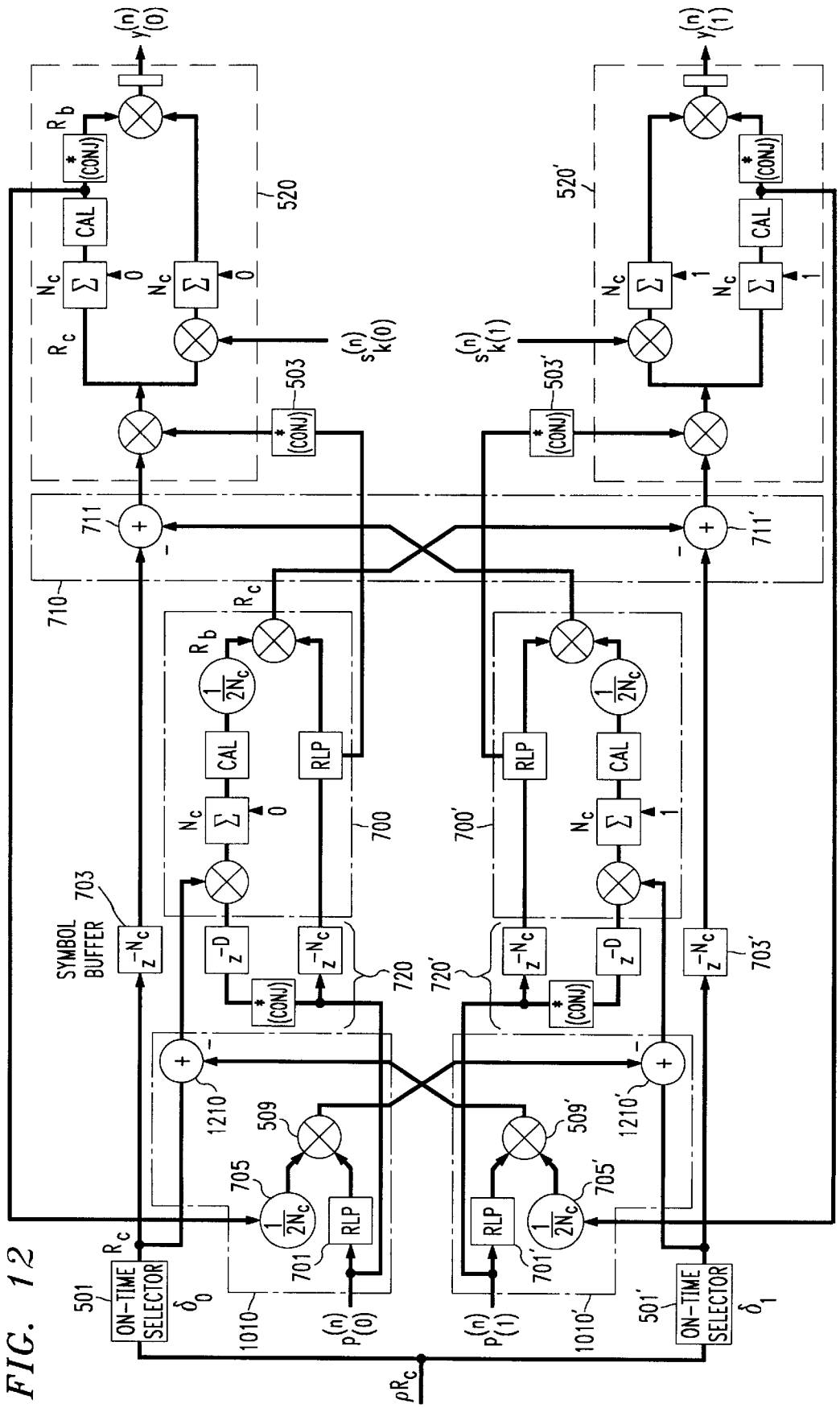
FIG. 12 shows a Detector C which uses recursive pre-cancellation with buffering.

The FIG. 12 shows a combination of the two ideas introduced above: First, using a buffer (i.e., 703 and 703') for having the latest channel estimate available in the CAL for pilot reconstruction (by 700 and 700'); and second, a recursive loop (i.e., 1010 and 1010') so that even the channel estimation of the pilot reconstruction benefits from a previous pilot cancellation. As shown the recursive loop block 1010' enables (using adder 1210) a detected pilot signal from path 1 to be subtracted from the signal inputted to the pilot detector 700 of the path 0. Similarly, the recursive loop block 1010 enables (using adder 1210') a detected pilot signal from path 0 to be subtracted from the signal inputted to the pilot detector 700' of the path 1. Again, the remaining blocks of Detector C operate in the same manner as the identically numbered blocks of previous Figures.

The timing-chart, not shown, for Detector C which uses the channel estimates for the pilot reconstruction, is similar to that of Detector A except that now there is an additional cancellation that potentially offers better channel estimates for the pilot reconstruction.

Performance—Detector C

Detector C combines both the latest channel estimate available for pilot reconstruction, and a channel estimate for pilot reconstruction which is obtained from data which benefits from a previous cancellation. However, the performance gain over detector B may not be striking enough to justify the additional hardware complexity (symbol-buffer, a second pilot reconstruction processing with RLP and multiplications at the chip-rate are needed).

POST-ACCUMULATION CANCELLATION SCHEMES

In these post-cancellation schemes the pilot cancellation (subtraction) is performed at the symbol rate $R_b$. The motivation to do post-cancellation is to get rid of multiplications at the chip-rate $R_c$.

A—Post-Demodulation Cancellation (Detector D)

Figure 13:
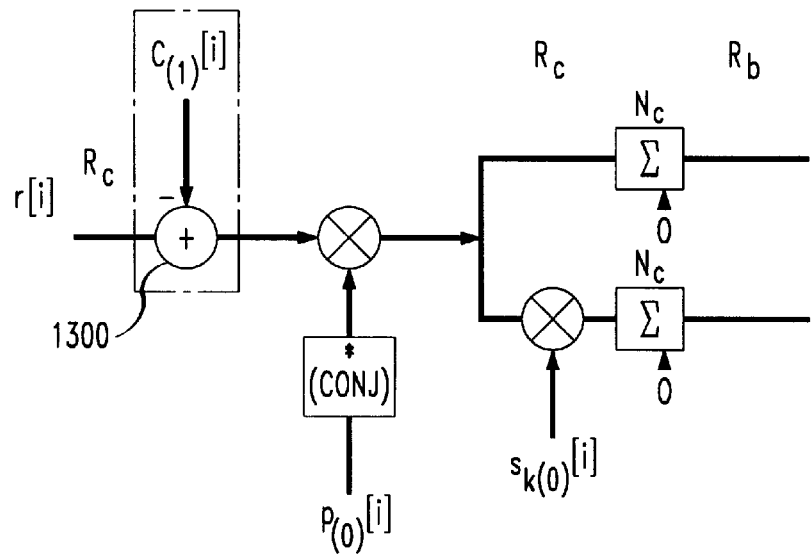
FIG. 13 shows a simplified illustration of the pre-cancellation scheme in accordance with the present invention.
Figure 13A:
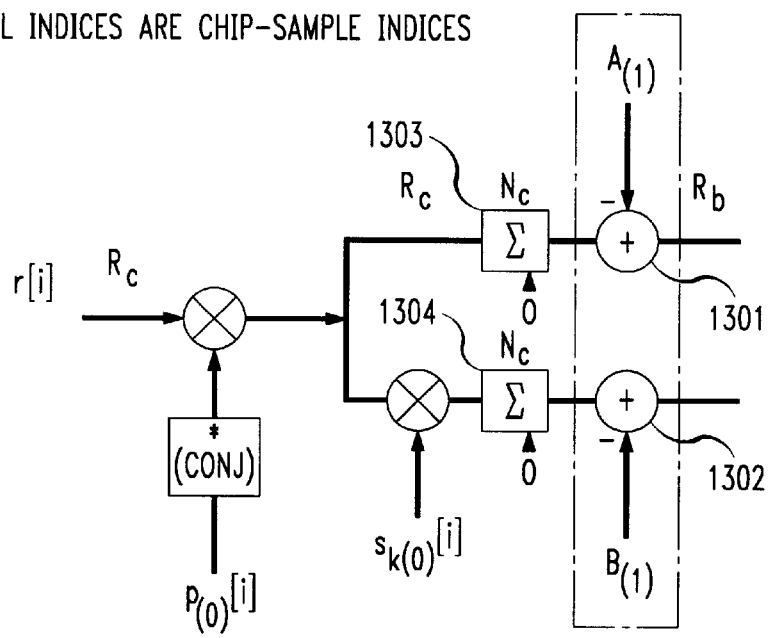
FIG. 13A shows a simplified illustration of the post-cancellation scheme in accordance with the present invention.

In the pre-cancellation schemes, e.g., FIG. 13, the reconstructed pilot signal ($C_{(i)}[i]$) gets cancelled out from the received signal r[i] (in adder 1300) at the chip-rate prior to demodulation. In FIG. 13A the cancellation stage (adders 1301 and 1302) is placed after the accumulators (1303 and 1304), to perform the cancellation on the symbol-rate samples.

Figure 14:
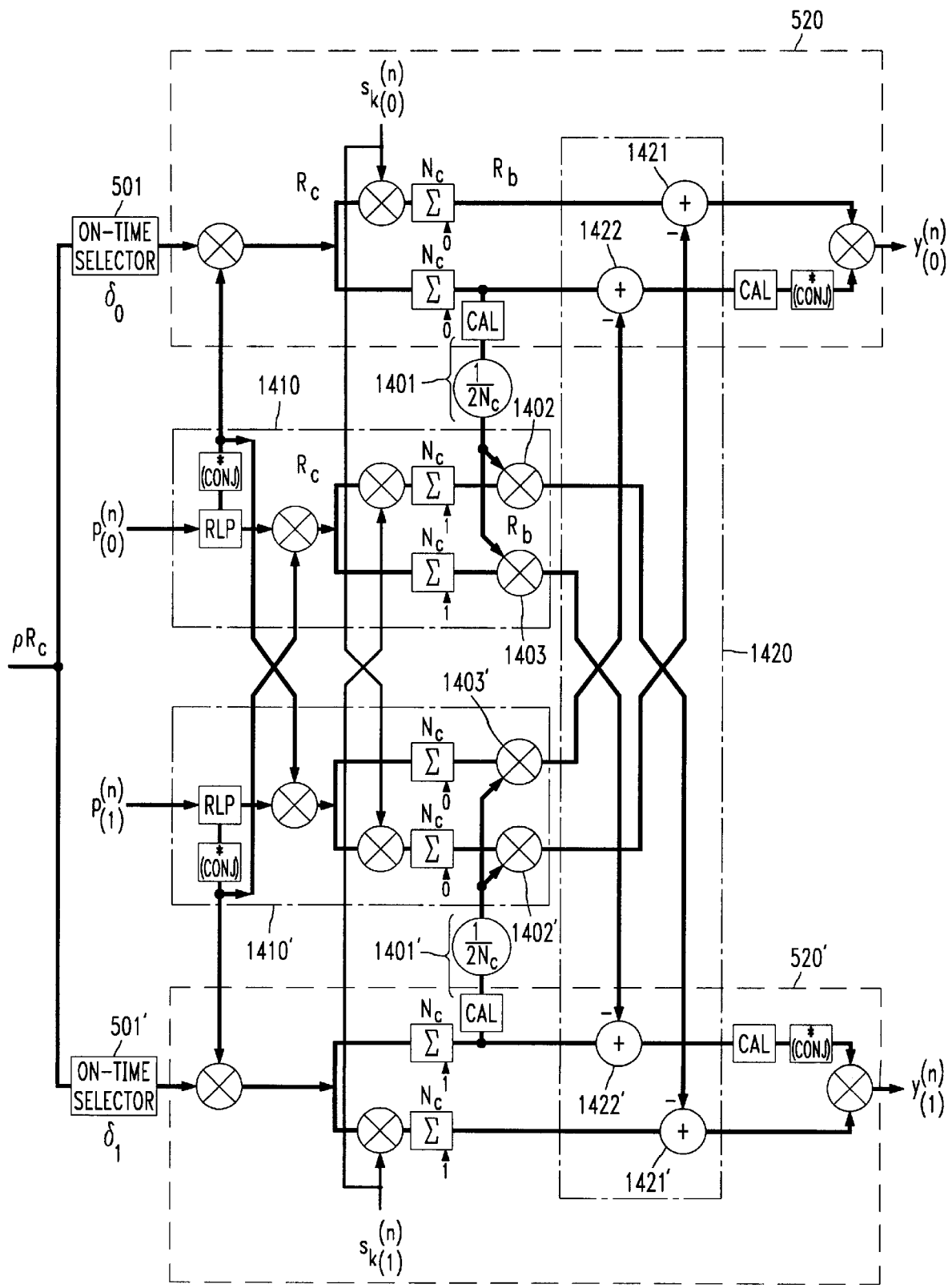
FIG. 14 shows a diagram of a Detector D which uses post-cancellation.

With reference to FIG. 14, the Detector D is shown including on-time selectors 501 and 501'; CAL circuits 1401 and 1401'; demodulators 520 and 520'; pilot detectors 1410 and 1410'; and adder circuit 1420. The operations of on-time selectors 501 and 501' and demodulators 520 and 520' have previously been described.

The Detector D uses a reconstructed pilot signal which is accumulated separately (in pilot detectors 1410 and 1410') and multiplied (in multipliers 1402, 1403 and 1402', 1403') by the channel estimate (from demodulators 520 and 520' and CAL circuits 1401 and 1401') at the symbol-rate $R_b$. The resulting pilot signals from 1402 and 1402' are then summed in adders 1421 and 1421' to the traffic (data) signal of demodulators 520 and 520', respectively. The resulting pilot signals from 1403 and 1403' are then summed in adders 1422 and 1422 to the channel estimates of demodulators 520 and 520', respectively.

A nice side-effect of post-cancellation is that there is no symbol-buffer (e.g., 703 of FIG. 7) necessary anymore (and even no alignment-buffer, e.g., 706) to include the latest channel estimate in the CAL for pilot reconstruction, since the channel estimate multiplication is delayed up to the end of the current symbol.

The structure of Detector D is equivalent to detector A, shown in FIG. 7, with alignment-buffer but needs neither a symbol-buffer not an alignment-buffer.

Figure 15:
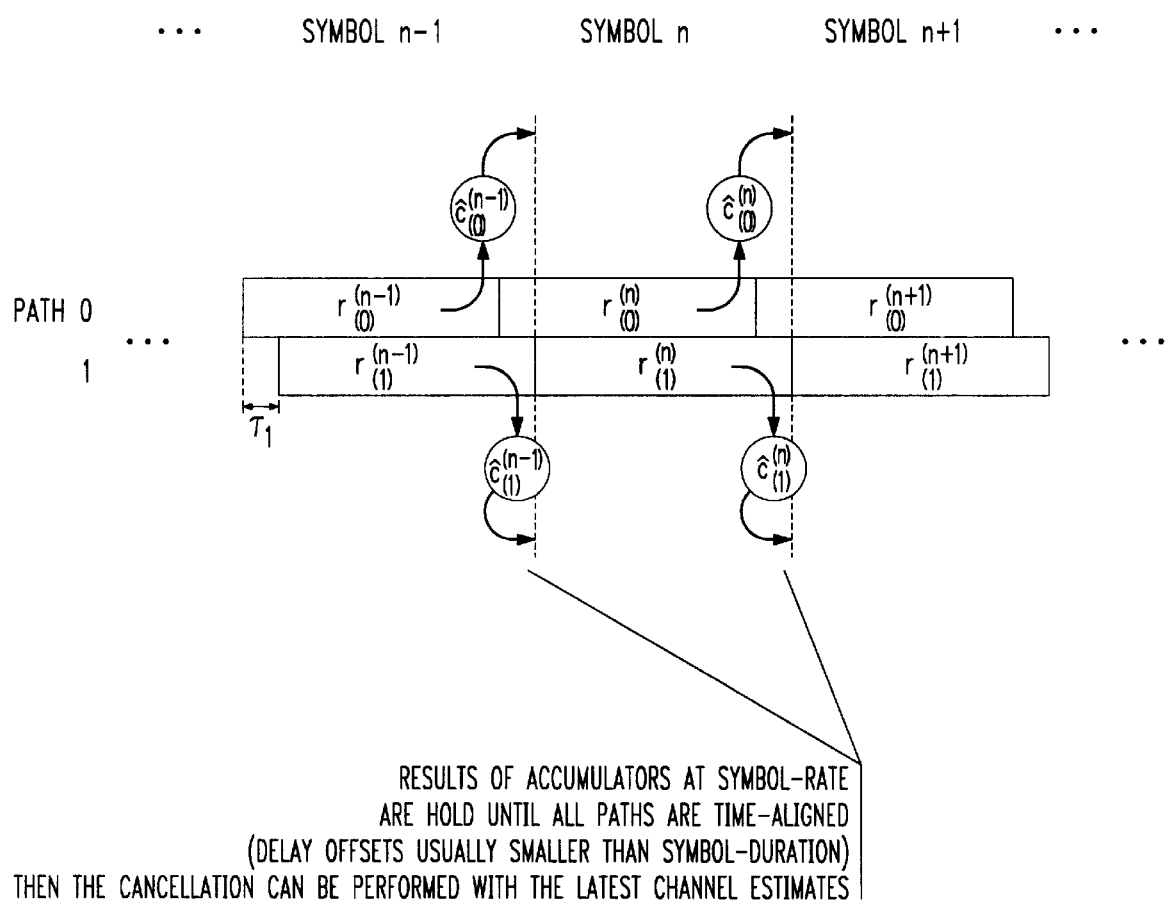
FIG. 15 shows the timing diagram for the Detector D of FIG. 14.

Shown in FIG. 15 is a timing diagram for Detector D. As shown, the results of accumulators, at symbol rate $R_b$, are held until all paths are time-aligned (delay offsets are usually smaller than symbol durations) and then the cancellation is performed with the latest channel estimates. It should be mentioned that the delay-alignment control (accumulator outputs are held) at the symbol-rate is not explicitly shown in the drawings.

The performance of Detector D is similar to that of Detector A.

B—Multistage Post-Cancellation (Detector E)

Figure 16:
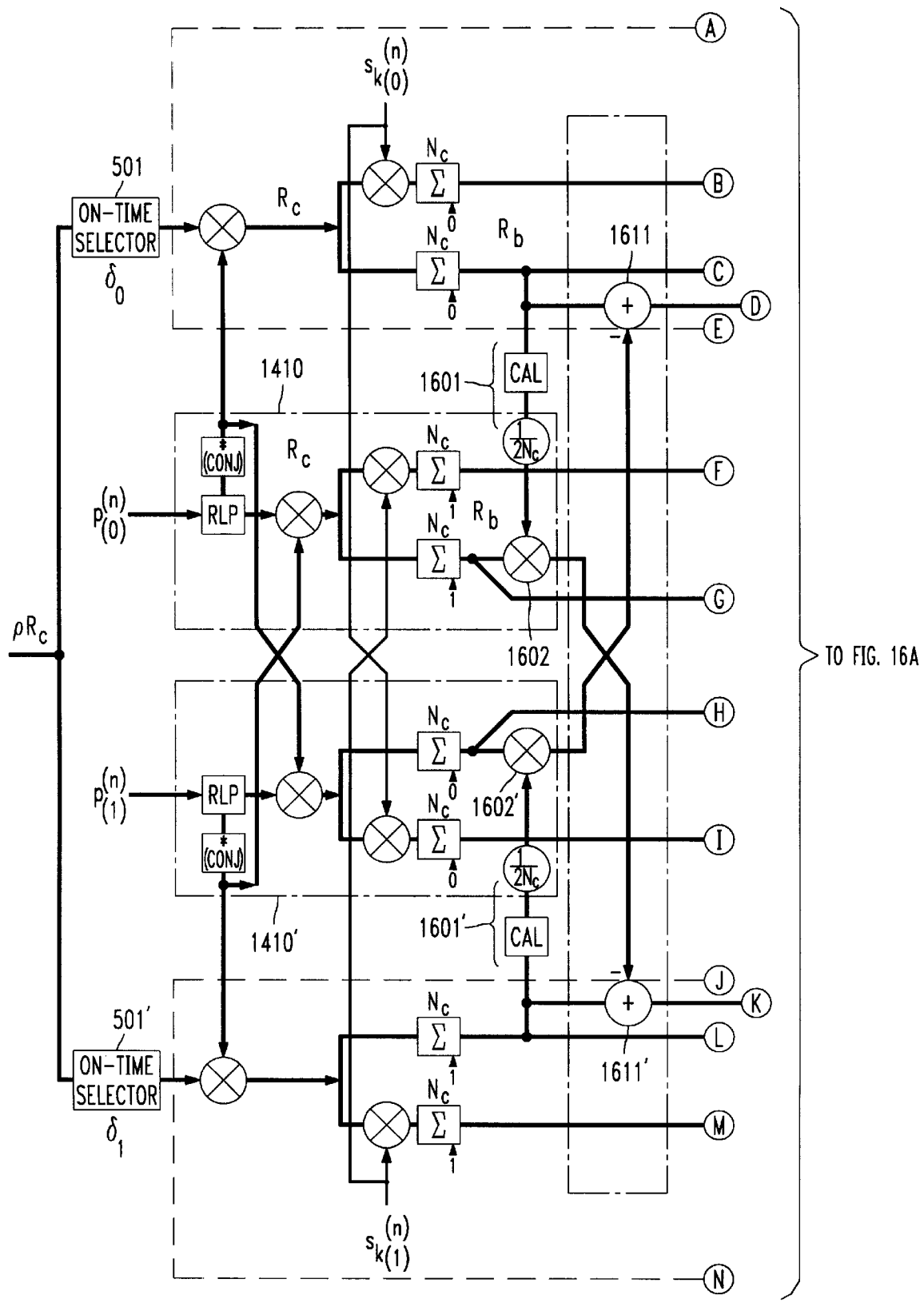
FIGS. 16 and 16A shows a diagram of a Detector E which uses multistage post-cancellation.
Figure 16A:
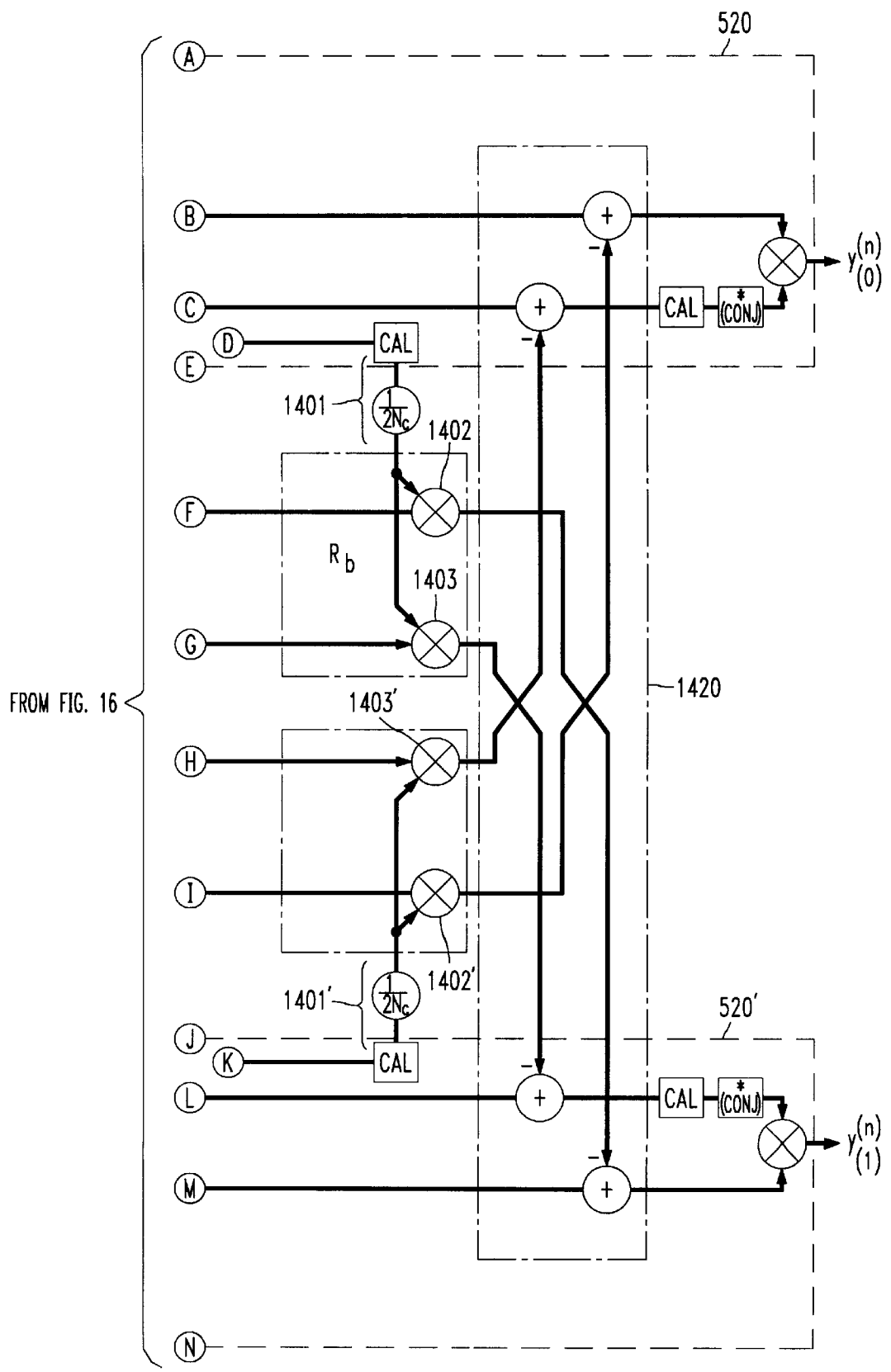

The Detector D post-cancellation scheme did not cancel the pilot signal using a channel estimate which itself took advantage of a previous pilot cancellation. The structure of Detector E is shown in FIG. 16 and FIG. 16A.

Detector E is shown including on-time selectors 501 and 501'; CAL circuits 1401 and 1401'; demodulators 520 and 520'; pilot detectors 1410 and 1410'; adder circuit 1420; and multipliers 1402, 1403 and 1402', 1403', the operations of which have previously been described. Additionally, Detector E includes CAL circuits 1601 and 1601' and multipliers 1602 and 1602' which provide a first cancellation stage where only the channel estimate of 1410 and 1410' gets refined. Thereafter, using the better channel estimate the actual cancellation is performed in adder circuit 1420.

The timing diagram of Detector E is the same as that for Detector D, shown in FIG. 15.

Performance Detector E

The performance of Detector E will be close (slightly better) to Detector C, since all channel estimates used for pilot reconstruction or prior to cancellation are the latest ones.

It is clear that we could have any number of cancellation stages for obtaining a better channel estimate. But most probably even a single one is not worth implementing in a handset receiver (FIG. 2) since the benefit of having a slightly better channel estimate is not significant.

E—Example of a 3 Finger Structure

Figure 17:
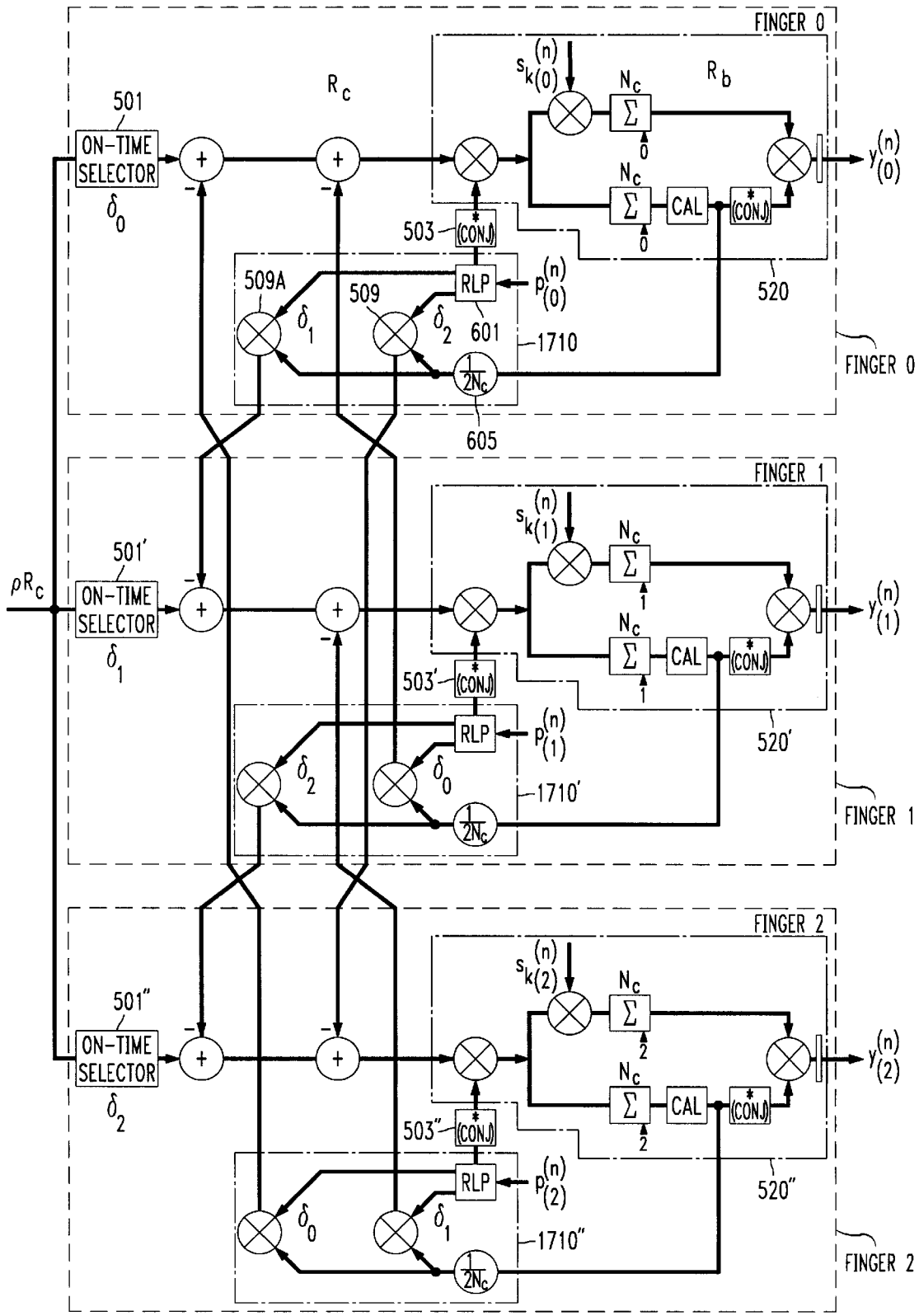
FIG. 17 shows an illustrative block diagram of our inventive pilot cancellation scheme (according to detector B) as applied to a three finger coherent CDMA receiver.

Shown in FIG. 17 is an illustrative arrangement of a three finger (3 path) receiver that uses recursive pre-cancellation without buffer working with previous channel estimates (i.e., Detector B of FIG. 10). For the IS-95 handset receiver a 3 finger design is proposed.

The RLP, e.g., 601, now has 2 outputs since the two other fingers, 1 and 2, can have different timing for their on-time samples. Thus the reconstruction of pulse-shape of e.g., pilot 0, needs two different fractional delay offsets $\delta_1$, $\delta_2$ for finger 1, and 2. Note, that in finger 0 (path 0) the pilot from both fingers 1 and 2 (paths 1 and 2) are cancelled from the signal inputted to finger 0. Similarly, fingers 1 and 2 also have the respective pilot signal signals of the other channels cancelled from their input signals. The remaining parts of this receiver operates the same as Detector previously described for Detector B of FIG. 10.

Reconstruction Low-Pass Filter (RLP)

Most of the time there will be multipath components which are delayed in fractions of $T_c$ ($\delta_1 \neq 0$). Then the pulse-shaping has to be taken into account.

A—Need for Reconstructing the Pulse-Shape

Figure 18:
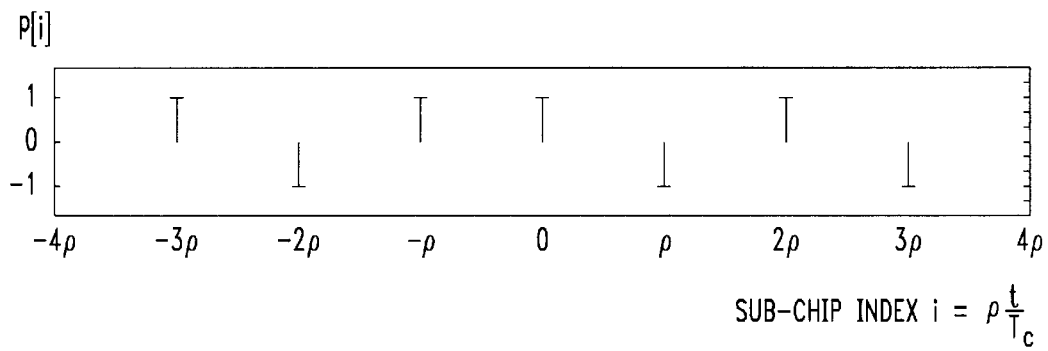
FIGS. 18–20 illustrate the need for pulse-shape Reconstruction Low Pass Filter (RLP)
Figure 19:
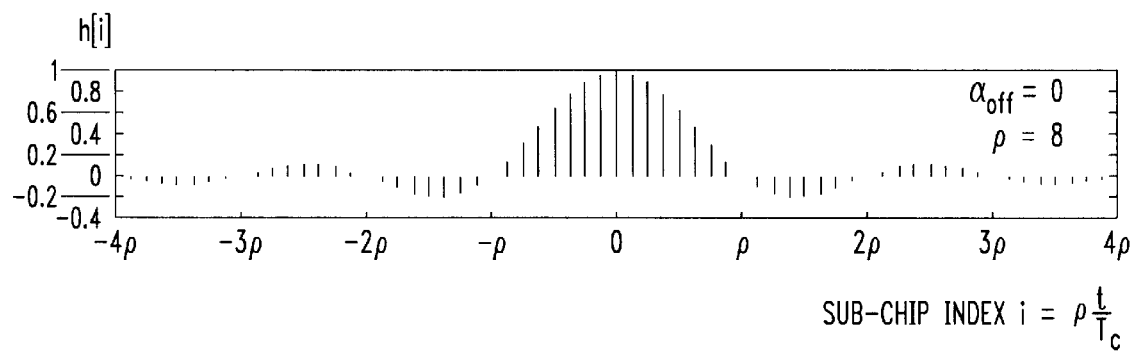
Figure 20:
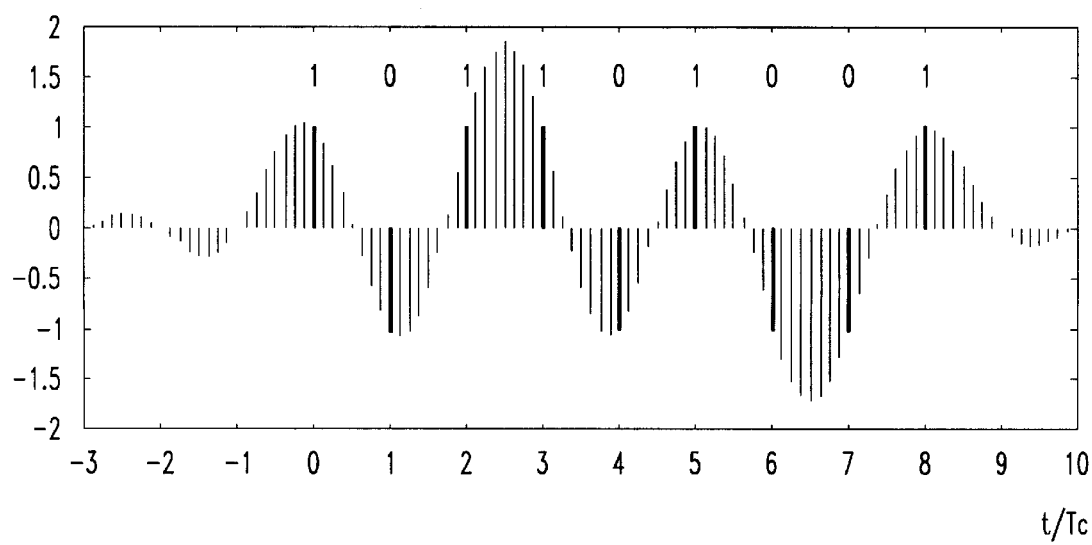

The FIGS. 18–20 illustrate the need of a pulse-shape Reconstruction Low-Pass Filter (RLP) when the timing offsets of the multipath components are not in multiples of $T_c$. A part of the sampled pilot signal (e.g. the I-channel) of multipath component 0 is shown. For this example, it is further assumed that the sampling times are $$T_s = i \cdot \frac{T_c}{\rho},$$

i integer, no I/Q-phase shift, and that the signal is normalized to 1 at the on-time samples.

$$pilot'_0[i] = P'_0[i] * h[i] = \sum_{j=-\infty}^{\infty} P'_0[j] \cdot h[i-j] \quad (*1)$$

with normalized Nyquist pulse shape $$h[i] = \mathrm{sinc}\left(\pi \frac{i}{\rho}\right) \cdot \frac{\cos\left(\pi \alpha_{off} \frac{i}{\rho}\right)}{1 - \left(2\alpha_{off} \frac{i}{\rho}\right)} = \begin{cases} 1, \frac{i}{\rho} = 0 \\ 0, \frac{i}{\rho} \neq 0 (ISI-\text{free}) \end{cases} \quad (*2)$$

and roll-off factor $\alpha_{off}$ (IS-95: $\alpha_{off}$≈0.1); i is a sub-chip sample index.

Shown in FIG. 18 is a short-code sequence, with signal P[i] with sub-chip index.

Shown in FIG. 19 is a normalized time domain impulse response of a Nyquist-raised cosine filter, up to 4 sidelobes.

Shown in FIG. 20 is an example of the pulse-shaped pilot for multipath component 0. The above pilot signal may belong to multipath component 0. Then the on-time samples at the chip-rate are (ideally) either +1 or −1 (normalized) since a Nyquist-pulse shaping filter was used in the transmitter (no ISI of neighbor-impulses at the on-time samples). (Actually, there is a square-root Nyquist raised filter in the transmitter. Together with the pulse shape matched filter in the receiver [also a square-root Nyquist raised filter] one obtains a Nyquist raised cosine pulse shaping in the baseband of the receiver.).

To cancel out this pilot signal from other multipath components (fingers)—e.g. Component 1—we have to consider the pulse-shape of the pilot signal 0 at the on-time samples of the respective multipath component 1. In other words, to cancel out the pilot signal of multipath component 0 from component 1, we have to reconstruct the pulse-shaped of pilot 0 at the on-time samples of signal 1 (RLP-coefficients $\alpha_{j,\delta_1}$). Since we no longer assume delays in multiples of $T_c$, the on-time samples of component 1 could be somewhere 'in between' (that means: $\delta_1 \neq 0$) and therefore according to (*1) the pulse-shaped of pilot signal 0 is of importance.

The FIR-implementation of the reconstruction low-pass filter is fairly simple. We approximate the discrete convolution summation in (*1) by a finite number of N taps (N is an even number).

Figure 21:
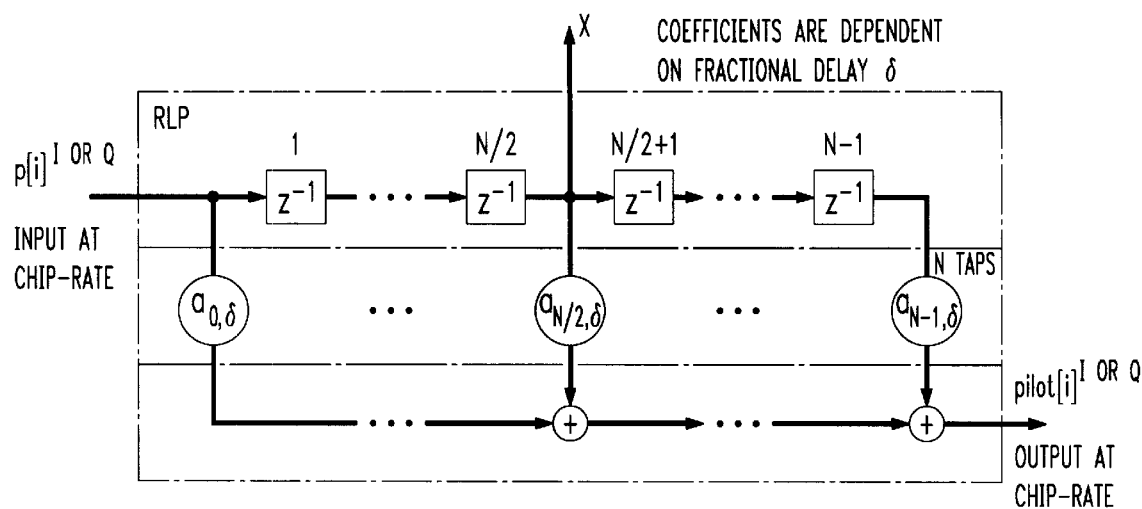
FIG. 21 shows a FIR-implementation of a RLP.

Shown in FIG. 21 is a FIR-implementation of a Reconstruction Low-Pass filter (RLP). The FIR-coefficients are $$a_{j,\delta} = h\left[\left(j - \frac{N}{2}\right) \cdot \rho + \delta\right]$$

and therefore dependent on the fractional part $\delta$ of the delay $\tau = \rho\Delta + \delta$. For $\delta = 0$ only $$a_{\frac{N}{2},0} = 1;$$

the other coefficients become zero. This is true for delays that are integer multiples of $T_c$. The pulse-shaped output at the chip-rate is $$pilot_\delta^{I,Q}[i] = \sum_{j=0}^{N-1} a_{j,\delta} \cdot p^{I,Q}[i-j]$$

now with i as a chip-sample index, and $p^{I,Q}[i]$ as the short-code sequence.

Further Aspects for Implementing the RLP

1. It turns out that a very small number N of taps (4 or even 2) is enough to get a sufficient approximation of the pilot pulse-shape.
2. The multipliers (coefficients) are simple switches since the incoming PN-sequence is only consisting of +1, −1.
3. The pulse-shape h[i] may be stored as a lookup-table for $$\frac{N}{2} \cdot \rho$$

values (symmetrical). Thus for N=4 taps, $\rho=8$ and 4-bit values the table size is 64 bits.

4. Also possible is a implementation as one single lookup-table (then no switches or adders necessary): Take the N binary values of the incoming PN-sequence and produce an output according to the fractional delay $\delta=0\ldots\rho-1$. The size of this table would be $2^N \cdot \rho$ values which can be reduced by a factor of 4 by exploiting the symmetry (but then a more complex access mechanism needed). Again—with N=4 taps, $\rho=8$ and 4 bit values—the table size is 512 bit without and 128 bit with exploiting the symmetry. Most probably 3 is easier to implement.

5. The processing delay at the chip-level introduced by the FIR-filter is $$D_{FIR} = \frac{N}{2}$$

chips. To compensate this delay the input of the PN-short-code into the RLP should be performed D chips ahead (in the PN-period) in comparison to the demodulating PN-sequence. This can easily be done by taking the PN-sequence for demodulation from the middle of the tapped delay line (see above FIG. 21, point X).

6. If there is more than one pilot signal to reconstruct per finger (e.g. reconstruct pilot 0 at two different fractional delay offsets $\delta_1$, $\delta_2$ for multipath component 1, 2) then we need the a second RLP at finger 0 according to the respective delay offset $\delta_2$. Since the tapped delay line of the RLP filter is the same for both we just need to add a new set of coefficients $\alpha_{j,\delta_2}$ to the existing RLP $\alpha_{j,\delta_1}$ and share the tapped delay line. This reduces the complexity.

Additional Implementations

In simulations of fast fading environments it turns out that pilot interference cancellation should only be performed if the channel estimate used for pilot signal reconstruction is obtained from a multipath component which exceeds a certain power threshold. Otherwise, we may unnecessarily reduce the BER-advantage of pilot cancellation by using bad channel estimates.

For this purpose a simple switch is added to each finger of the presented designs which switches off the pilot cancellation for the respective multipath component if the received signal-power of that component is too small (due to a short deep fade). The signal power of each multipath component is calculated anyway in a practical implementation. Thus, there is no additional hardware required—except for the switch and a threshold detector.

According to another feature of the present invention, a switch controls whether pilot interference cancellation for a particular pilot signal should or should not occur. The decision for this switch is optimum according to a minimum mean-squared error criterion (MMSE), and can be implemented using linear combiners and a threshold device. Hence with a simple decision device, we can determine the optimum set of pilots to cancel and theoretically improve the performance of our pilot interference cancellation system.

Figure 22:
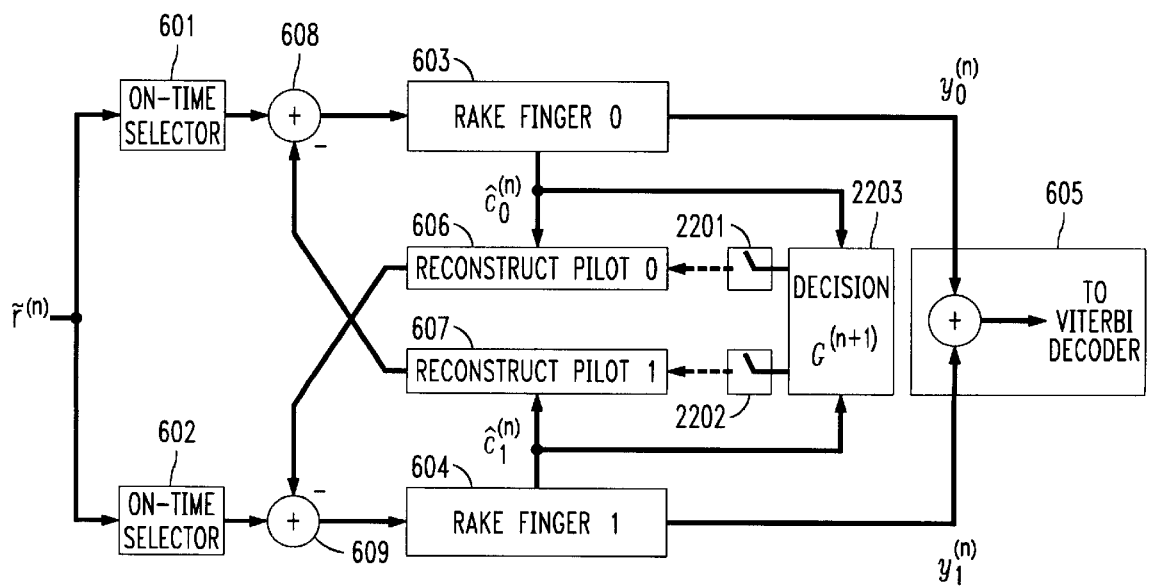
FIG. 22 shows an illustrative two finger coherent CDMA receiver including switchable pilot interference cancellation, in accordance with the present invention.

FIG. 22 shows an enhanced PIC detector or receiver of FIG. 6 with the added switch capability (2201, 2202) controlled by Decision unit 2203. Let $\hat{G}_l^{(n)}$ be the set of pilots which are canceled for the lth finger during symbol interval n. Since pilot l is required to estimate the subtractor for path l, it cannot be canceled from finger 9. Hence $\hat{G}_l^{(n)}$ is a subset of the set $\{0,1,\ldots,j,\ldots,L-1;\ j\neq l\}$. (For example, if L=3 then an allowable group of cancellation sets is $\hat{G}_0^{(n)}=\{1,2\}$, $\hat{G}_1^{(n)}=\{0,2\}$, and $\hat{G}_2^{(n)}=\{0\}$.) Using the criteria derived in the following section and the channel estimates $\hat{c}_0^{(n)}$ and $\hat{c}_1^{(n)}$, the Decision unit 2203 determines the cancellation sets $\hat{G}_0^{(n+1)}$ and $\hat{G}_1^{(n+1)}$ for pilot cancellation on the next symbol interval. If $\hat{G}_1^{(n+1)}=\{0\}$, the top switch is on, and pilot 0 is reconstructed using $\hat{c}_0^{(n)}$ and canceled from the input to finger 1 on the next symbol interval. Otherwise, if $\hat{G}_1^{(n+1)}=0$, then switch 2201 is off and no pilot 0 signal cancellation occurs for finger 1. Likewise, if $\hat{G}_0^{(n+1)}=\{1\}$, the bottom switch is on, and pilot 1 is reconstructed using $\hat{c}_1^{(n)}$ and canceled from the input to finger 1 on the next symbol interval. Otherwise, $\hat{G}_0^{(n+1)}=0$ then switch 2202 is off and no pilot 1 signal cancellation occurs for finger 0.

Figure 23:
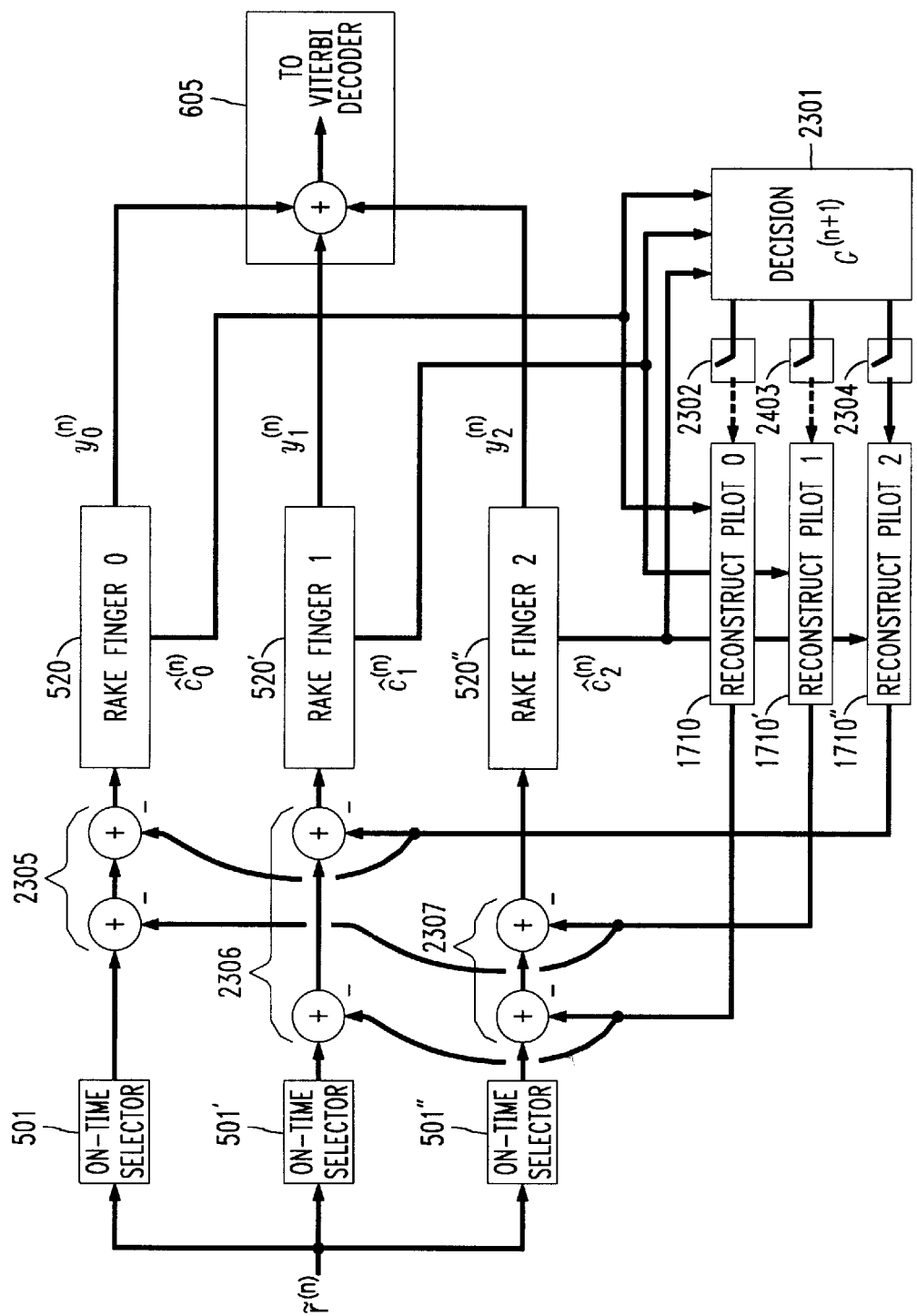
FIG. 23 shows an illustrative three finger coherent CDMA receiver including switchable pilot interference cancellation.

FIG. 23 shows the implementation for an L=3 finger RAKE receiver. FIG. 23 is essentially FIG. 17 with the addition of Decision unit 2301 and switches 2302 and 2304. Note that we must reconstruct L−1 versions of pilot l, each using a separate Reconstruction Low-Pass Filter (RLPF), to match the multipath delay of the finger from which we are canceling the pilot. For example, for path 0 we construct the pilot signal for paths 1 and 2 (in 1710' and 1710", respectively) which must then be subtracted from the path 0 signal (using adders 2305). Similarly, pilots 0 and 1 are subtracted from the path 2 signals (using 2307) and pilots 0 and 2 are subtracted from path 1 signals (using 2306).

Derivation of the Switch Mechanism

We now derive the MMSE switch set for pilot interference cancellation. Our goal is to determine the switch sets $\hat{G}_0^{(n)}, \ldots, \hat{G}_{L-1}^{(n)}$ which minimize the mean-squared error of the sum of RAKE finger outputs. The output of finger l is a function of the switch set l: $y_l^{(n)}(\hat{G}_l^{(n)})$. Hence our objective is to evaluate the following:

$$\{\hat{G}_0, \ldots, \hat{G}_{L-1}\} = arg \min_{G_0, \ldots, G_{L-1}} E\left[\left\{\sum_{l=0}^{L-1} y_l(G_l) - \sum_{l=0}^{L-1} \bar{y}_l\right\}^2\right] \quad (3)$$

where $\bar{y}_l \equiv E(y_l(G_l))$ and the expectation is taken with respect to the random spreading codes, the interferers' data bits, and the background thermal noise. Evaluating the right hand side of (3), we have $$E\left[\left\{\sum_{l=0}^{L-1} y_l(G_l) - \sum_{l=0}^{L-1} \bar{y}_l\right\}^2\right] = E\left[\left\{\sum_{l=0}^{L-1} (y_l(G_l) - \bar{y}_l)\right\}^2\right]$$

$$= \sum_{l=0}^{L-1} E[(y_l(G_l) - \bar{y}_l)^2] + \underbrace{\sum_{l=0}^{L-1}\sum_{j\neq l} 2E[(y_l(G_l) - \bar{y}_l)(y_j(G_j) - \bar{y}_j)]}_{0}$$

$$= \sum_{l=0}^{L-1} Var(y_l(G_l))$$

Hence the variance of the sum is the sum of the variances, and it follows that our original decision rule in (3) becomes $$\hat{G}_l^{(n)} = \underset{G_l^{(n)}}{argmin} Var[y_l^{(n)}(G_l^{(n)})], l = 0, \ldots, L-1 \quad (4)$$

It can be shown that the MMSE set $\hat{G}_l^{(n)}$ is:

$$\hat{G}_l^{(n)}=\{j: \|c_j^{(n)}\|^2 \geq Var[\hat{c}_j^{(n-1)}(\hat{G}_j^{(n-1)})], j\neq l\}. \quad (5)$$

Of course since the actual channel parameter $c_j^{(n)}$ is not known, we should use its estimate $\hat{c}_j^{(n)}(\hat{G}_j^{(n)})$ in the decision. However, this substitution would lead to a dependence of $\hat{G}_l^{(n)}$ on itself. To remedy this situation, we make the assumption that the channel variations between symbols is relatively small, and consequently, we can use $\hat{c}_j^{(n-1)}(\hat{G}_j^{(n-1)})$ in place of $\hat{c}_j^{(n)}(\hat{G}_j^{(n)})$ to give us the cancellation set:

$$\hat{G}_l^{(n)}=\{j: \|\hat{c}_j^{(n-1)}(\hat{G}_j^{(n-1)})\|^2 \geq Var[\hat{c}_j^{(n-1)}(\hat{G}_j^{(n-1)})], j\neq l\}. \quad (5)$$

The decision to cancel pilot j depends only on the corresponding estimated channel power $\|c_j^{(n-1)}(\hat{G}_j^{(n-1)})\|^2$ and the variance of the channel estimate. The intuition behind this decision is clear: if the power of a pilot signal j is stronger than the variance of its estimate, then the reconstructed pilot interference based on $c_j^{(n)}$ is reliable enough so that removing it from the finger input will lower its output MSE. Otherwise, if the power is too weak, removing the reconstructed pilot interference will actually increase the output MSE. Except for the condition that j≠l, this decision does not depend on the finger l, the target finger for pilot interference cancellation. Consequently, the set $\hat{G}_l^{(n)}$ is not a function of l, except of course that l is never a member of $\hat{G}_l^{(n)}$ since we are not allowed to cancel pilot l from finger l. With this exception in mind, we can represent $\hat{G}_0^{(n)} \ldots \hat{G}_{L-1}^{(n)}$ with $\hat{G}^{(n)}$. Note that the cancellation sets given in our earlier example, $\hat{G}_0^{(n)}=\{1,2\}$, $\hat{G}_1^{(n)}=\{0,2\}$, and $\hat{G}_2^{(n)}=\{0\}$, are not allowable according to (5) or (6) since pilot 1 is canceled from finger 0 but not from finger 2. A valid group of cancellation sets would be $\hat{G}_0^{(n)}=\{2\}$, $\hat{G}_1^{(n)}=\{0,2\}$, and $\hat{G}_2^{(n)}=\{0\}$; these sets are represented using $\hat{G}^{(n)}=\{0,2\}$ Defining $V(l,n,\hat{G}^{(n)}) \equiv Var[\hat{c}_l^{(n)}(\hat{G}^{(n)})]$ it can be shown that:

$$V(l, n-1, \hat{G}^{(n-1)}) = \quad (7)$$

$$\frac{1}{N}\left[\sum_{j\neq l, j\in G_l^{(n)}} V(j, n-2, \hat{G}^{(n-2)}) + \sum_{j\neq l, j\notin G_l^{(n)}} \|c_j^{(n-1)}\|^2 + \right.$$

-continued $$\left. \frac{KA_1^2}{A_0^2}\sum_{j\neq l} \|c_j^{(n-1)}\|^2 \right] + \frac{2\sigma^2}{A_0^2}$$

where N is the spreading factor (N=64 for IS-95), K is the number of active data/sync channels, $2\sigma^2$ is the thermal noise power per chip, $A_0$ is the pilot amplitude and $A_1$ is the amplitude of each of the K data/sync channels. Using the channel estimate from symbol interval n−2 in place of the actual channel parameter from symbol interval n−1, (7) becomes $$V(l, n-1, \hat{G}^{(n-1)}) = \frac{1}{N} \begin{bmatrix} \sum_{j \neq l, j \in G_l^{(n-1)}} V(j, n-2, \hat{G}^{(n-2)}) + \\ \sum_{j \neq l, j \notin G_l^{(n-2)}} \left\| \hat{c}_j^{(n-1)}(\hat{G}^{(n-1)}) \right\|^2 + \\ \frac{KA_1^2}{A_0^2} \sum_{j \neq l} \left\| \hat{c}_j^{(n-1)}(\hat{G}^{(n-1)}) \right\|^2 \end{bmatrix} + \frac{2\sigma^2}{A_0^2}. \qquad (8)$$

Hence on each symbol interval, the cancellation set $\hat{G}_l^{(n)}$ (l=0 . . . L−1) is determined using the following steps:

Calculate the channel estimate variances $V(l, n-1, \hat{G}^{(n-1)})$ for l=0 . . . L−1 using (8).

Determine $\hat{G}_l^{(n)}$ (l=0 . . . L−1) using (6).

In summary, the above derived switch mechanism for a pilot interference cancellation detector provides minimum mean-squared error rake detector outputs. The resulting decision rule for the switch is: if the power of the channel estimate for path l (l=0 . . . L−1) is high (i.e., greater than the variance of this estimate), then the associated pilot signal reconstructed using this channel estimate is reliable and should be canceled from the other L−1 rake finger inputs; otherwise, if the power of the channel estimate is low, then the reconstructed pilot signal is unreliable and cancellation using this pilot should not occur.

While out invention CDMA receiver has been described for use in a forward link utilizing a Walsh code pilot frequency and Walsh encoding to provide coherent operation, it should be noted that many other well known codes which maintain coherent operations may also be utilized in both the CDMA transmitter and CDMA receiver (typically in the forward link). Moreover, our coherent receivers while described for use in a coherent forward link they may also be used in a coherent reverse link.

What has been disclosed is merely illustrative of the present invention. Other arrangements can be implemented by those skilled in the art without departing from the spirit and scope of the present invention.

We claim:

1. A code division multiple access (CDMA) receiver for receiving and demodulating a coherent CDMA signal including at least one user data channel and a separate pilot channel over a plurality of L(L>or =2) paths, where the desired data channel is orthogonal to the pilot channel for a given path, the CDMA receiver comprising L path demodulators, each demodulator for estimating a data channel and a pilot channel from a CDMA signal received over one of the L paths and for generating L−1 pilot cancellation signals each to be used by an associated subtractor means, and L subtractor means, each subtractor means for subtracting the L−1 pilot cancellation signals produced by non-associated L−1 path demodulators from the CDMA signal associated with that subtractor means.

2. The CDMA receiver of claim 1 wherein the L−1 pilot cancellation signals are reconstructed pilot signals, and where each of the subtractor means is located prior to its associated demodulator to subtract the reconstructed pilot signals from the CDMA signal inputted to its demodulator.

3. The CDMA receiver of claim 1 wherein each of the L−1 pilot cancellation signals is a pair of correlator-processed reconstructed pilot signals, and where each of the subtractor means is a pair of subtractors located after a pilot and a data accumulator of its demodulator, to subtract the pair of correlator-processed reconstructed pilot signals from a signal outputted from its data and pilot accumulators.

4. The CDMA receiver of claim 2 wherein the pilot signals for cancellation are reconstructed using a channel estimation algorithm which has latest channel estimates available that are obtained by a first channel estimation performed over one symbol, and wherein the CDMA signal inputted to the demodulator is obtained by buffering an incoming chip-rate signal for one symbol.

5. The CDMA receiver of claim 2 wherein the pilot signals for cancellation are reconstructed using a channel estimation algorithm whose most recent channel estimate is taken from a previous symbol interval demodulation and wherein these channel estimates are used for both reconstructing the pilot signals and demodulating a previous symbol interval.

6. The CDMA receiver of claim 4 wherein a subtractor means prior to a first channel estimation over one symbol cancels out pilot signals reconstructed using a channel estimation algorithm whose most recent channel estimate is taken from a previous symbol interval demodulation.

7. The CDMA receiver of claim 3 wherein the pair of correlator-processed reconstructed pilot signals for cancellation are obtained using a channel estimation algorithm that has a most recent channel estimates available.

8. The CDMA receiver of claim 7 wherein a subtractor means prior to the channel estimation algorithm, whose output is used for reconstructing the pair of correlator-processed pilot signals, cancels out a first intermediate result of that component of the pair of correlator-processed pilot signals which is used for cancellation on pilot accumulator signals.

9. The CDMA receivers of claims 1 including reconstruction low-pass filters (RLP) for reconstructing the pulse shape of the L−1 pilot cancellation signals with respect to delay times of the other L−1 demodulators.

10. The CDMA receiver of claim 9 wherein the RLP filter is implemented using a finite impulse response (FIR) filter.

11. The CDMA receiver of claim 10 wherein the FIR filter is implemented using a look-up table for coefficients.

12. The CDMA receiver of claim 9 wherein the RLP filter is implemented using a look-up table.

13. The CDMA receivers of claims 1 including a switch means in each demodulator to switch on/off the generation of the L−1 pilot cancellation signals according to a signal power of its designated multipath component.

14. The CDMA receiver of claim 1 wherein the pilot channel is orthogonal to at least one user signal channel.

15. The CDMA receiver of claim 1 wherein the pilot channel is non-orthogonal to a desired user signal channel for a given path and wherein each demodulator generates the L−1 pilot cancellation signals and an additional cancellation signal for cancelling out the non-orthogonal pilot signal of its own multipath component prior to its demodulation, the cancellation of the non-orthogonal pilot signal occurs by using an additional subtraction in each of the L subtraction means.

16. The CDMA receiver of claim 1 wherein the plurality of signal channels are encoded using Walsh codes.

17. The CDMA receiver of claim 1 wherein the at least one user uses a plurality of signal channels.

18. The CDMA receiver of claim 1 wherein the coherent CDMA signal includes at least a Q and an I signal channel.

19. The CDMA receiver of claim 1 being part of a user station of a CDMA system including at least one base station and a plurality of user stations.

20. The CDMA receiver of claim 1 being part of a base station of a CDMA system including at least one base station and a plurality of user stations.

21. The CDMA receiver of claim 1 including
means for channel weighting the output of the subtractor means and
means for combining the weighted outputs.

22. A method of operating a Code Division Multiple Access (CDMA) receiver for receiving and demodulating a coherent CDMA signal including at least one use data channel and a separate pilot channel over a plurality of L(L>or =2) paths, where a desired data channel is orthogonal to the pilot channel for a given path, the method comprising the steps of:

at each of L path demodulators, estimating a data channel and a pilot channel from a CDMA signal received over one of the L paths and generating L−1 pilot cancellation signals each to be used by an associated subtractor means, and at each of L subtractor means, subtracting the L−1 pilot cancellation signals produced by non-associated L−1 path demodulators from the CDMA signal associated with that subtractor.

23. The CDMA receiver of claim 1 further comprising switch means for controlling the subtraction of one or more of the L−1 pilot cancellations signals, the subtraction of each of the L−1 pilot cancellation signals being controlled as a function of a determined threshold level based on a pilot signal received in the associated data channel signal and variances thereof.

24. The CDMA receiver of claim 23 wherein the L−1 pilot cancellation signals to be generated and subtracted is selected to minimize the mean square error of the demodulated CDMA signal.

* * * * *